(12) United States Patent
Hosokawa et al.

(10) Patent No.: US 11,243,073 B2
(45) Date of Patent: Feb. 8, 2022

(54) ORIENTATION CHARACTERISTIC MEASUREMENT METHOD, ORIENTATION CHARACTERISTIC MEASUREMENT PROGRAM, AND ORIENTATION CHARACTERISTIC MEASUREMENT DEVICE

(71) Applicant: HAMAMATSU PHOTONICS K.K., Hamamatsu (JP)

(72) Inventors: Kiyotada Hosokawa, Hamamatsu (JP); Shigeru Eura, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 22 days.

(21) Appl. No.: 16/613,996

(22) PCT Filed: Nov. 22, 2017

(86) PCT No.: PCT/JP2017/042073
§ 371 (c)(1),
(2) Date: Nov. 15, 2019

(87) PCT Pub. No.: WO2018/216246
PCT Pub. Date: Nov. 29, 2018

(65) Prior Publication Data
US 2020/0088514 A1 Mar. 19, 2020

(30) Foreign Application Priority Data
May 23, 2017 (JP) .............................. JP2017-101926

(51) Int. Cl.
*G01B 11/26* (2006.01)
(52) U.S. Cl.
CPC .................................. *G01B 11/26* (2013.01)

(58) Field of Classification Search
CPC ............. G01N 21/645; G01N 21/6445; G01N 2021/6484; G01N 2021/6417;
(Continued)

(56) References Cited

U.S. PATENT DOCUMENTS

| 4,849,623 A | 7/1989 | Osaki et al. |
| 5,808,738 A | 9/1998 | Garcia-Rubio |

(Continued)

FOREIGN PATENT DOCUMENTS

| CN | 1847816 A | 10/2006 |
| CN | 103477206 A | 12/2013 |

(Continued)

OTHER PUBLICATIONS

International Preliminary Report on Patentability dated Dec. 5, 2019 for PCT/JP2017/042073.

(Continued)

*Primary Examiner* — Mohamed K Amara
(74) *Attorney, Agent, or Firm* — Faegre Drinker Biddle & Reath LLP

(57) ABSTRACT

An orientation characteristic measurement system includes an irradiation optical system, a detection optical system, a light detector, a rotation mechanism changing an angle (φ) between a surface of the sample and an optical axis (L2) of the detection optical system, and a computer, and the computer includes a rotation mechanism control unit controlling the rotation mechanism, a distribution acquisition unit normalizing an angle-dependent distribution of light intensity to acquire an angle-dependent distribution of light intensity, an area specifying unit specifying light intensity in a maximum area on the basis of the angle-dependent distribution of the light intensity, and a parameter calculation unit calculating the orientation parameter (S) on the basis of a linear relationship determined using the film thickness and refractive (Continued)

index of the sample and the light intensity in the maximum area.

12 Claims, 15 Drawing Sheets

(58) Field of Classification Search
CPC ........... G01N 21/6428; G01N 21/6456; G01N 21/64; G01N 21/6458; G01B 11/0616; G01B 11/26
See application file for complete search history.

(56) References Cited

U.S. PATENT DOCUMENTS

| | | | |
|---|---|---|---|
| 6,151,116 A | 11/2000 | Hirosawa | |
| 10,139,682 B2 * | 11/2018 | Zhan | G02F 1/133784 |
| 2003/0002043 A1 * | 1/2003 | Abdulhalim | G01B 11/26 356/400 |
| 2003/0020911 A1 | 1/2003 | Wang et al. | |
| 2003/0099422 A1 * | 5/2003 | Beom | G01N 21/645 385/12 |
| 2005/0094160 A1 | 5/2005 | Murai et al. | |
| 2006/0222782 A1 * | 10/2006 | Takei | G02F 1/1309 428/1.1 |
| 2007/0187617 A1 * | 8/2007 | Kong | G01N 21/8507 250/461.1 |
| 2008/0002137 A1 * | 1/2008 | Kim | G02F 1/1341 349/187 |
| 2009/0032731 A1 * | 2/2009 | Kimura | G01N 21/6452 250/458.1 |
| 2009/0126494 A1 | 5/2009 | Karasawa et al. | |
| 2011/0269358 A1 * | 11/2011 | Peng | D03D 15/44 442/59 |
| 2015/0338345 A1 * | 11/2015 | Lakowicz | G02B 5/008 435/5 |
| 2017/0191870 A1 * | 7/2017 | Ockenfuss | G01N 21/645 |

FOREIGN PATENT DOCUMENTS

| | | |
|---|---|---|
| CN | 105940282 A | 9/2016 |
| CN | 106461463 A | 2/2017 |
| JP | S64-35418 A | 2/1989 |
| JP | H08-43307 A | 2/1996 |
| JP | 2002-267573 A | 9/2002 |
| JP | 2006-308549 A | 11/2006 |
| TW | 517278 B | 1/2003 |
| TW | I489080 B | 6/2015 |

OTHER PUBLICATIONS

Komino, Takeshi et al., "Electroluminescence from completely horizontally oriented dye molecules," Applied Physics Letters 108, 241106, 2016, pp. 241106-1-241106-5.

Lukosz, W. et al., "New Method for Determining Refractive Index and Thickness of Fluorescent Thin Films," Optics Communications, vol. 31, No. 3, Dec. 1979, pp. 251-256.

Lukosz, W., "Light emission by multipole sources in thin layers. I. Radiation patterns of electric and mangetic dipoles," J. Opt. Soc. Am., vol. 71, No. 6, Jun. 1981, pp. 744-754.

Wolfgang Brljtting et al., "Device efficiency of organic light-emitting diodes: Progress by improved light outcoupling", Physica Status Solidi. A: Applications and Materials Science, vol. 210, No. 1, Sep. 24, 2012, p. 44-p. 65, XP055561096.

Frischeisen Jorg et al., "Determination molecular dipole orientation in doped fluorescent organic thin films by photoluminescence measurements", Applied Physics Letters, A I P Publishing LLC, US, vol. 96, No. 7, Feb. 17, 2010, p. 73302, XP012132258.

Takeshi Komino et al., "Selectively Contralled Orientational Order in Linear-Shaped Thermally Activated Delayed Fluorescent Dopants", Chemistry of Materials, vol. 26, No. 12, Jun. 6, 2014, p. 3665-p. 3671, XP055561032.

Liu Xiaoyan et al., "Angular Dependence of Dynamic Light Scattering", ACTA Optica Sinca, vol. 32, No. 6, Jun. 30, 2012, p. 0629002-1-p. 0629002-6.

* cited by examiner

ORIENTATION CHARACTERISTIC MEASUREMENT METHOD, ORIENTATION CHARACTERISTIC MEASUREMENT PROGRAM, AND ORIENTATION CHARACTERISTIC MEASUREMENT DEVICE

TECHNICAL FIELD

The present disclosure relates to an orientation characteristic measurement method, an orientation characteristic measurement program, and an orientation characteristic measurement device.

BACKGROUND ART

In recent years, the importance of evaluation and control of molecular orientation of a sample such as an organic EL (electro luminescence) material has increased due to the need for high efficiency of a device using an organic EL material or the like. In an evaluation method of the related art, an orientation parameter indicating an in-plane molecular orientation order of an organic EL material has been determined by comparing a measurement result of angle-dependent characteristics of a p-polarization component of a fluorescent light spectrum dependent on an orientation order of molecules in the organic EL material with a simulation result of the angle-dependent characteristics (see Non-Patent Literature 1 below).

CITATION LIST

Patent Literature

[Non-Patent Literature 1] Takeshi Komino, 6 others, "Electroluminescence from completely horizontally oriented dye molecules," APPLIED PHYSICS LETTERS 108, 241106 (2016)

SUMMARY OF INVENTION

Technical Problem

In a method of determining the orientation parameter described in Non-Patent Literature 1 above, complex simulation calculation regarding the angle-dependent characteristics is required to determine the orientation parameter. Therefore, a calculation time for determining the orientation parameter tends to increase.

An object of an embodiment is to provide an orientation characteristic measurement method, an orientation characteristic measurement program, and an orientation characteristic measurement device.

Solution to Problem

An embodiment of the present invention is an orientation characteristic measurement method. The orientation characteristic measurement method is a method of calculating an orientation parameter of a sample having a predetermined refractive index and disposed to a predetermined film thickness on a light transmitting substrate using an irradiation optical system configured to irradiate the sample with irradiation light, a detection optical system configured to guide detection light emitted from the sample with the irradiation of the irradiation light, and a light detector configured to detect the detection light, and includes a detection step of detecting the detection light using the light detector while changing a formed angle between a line perpendicular to a surface of the sample on the emitting side of the detection light and an optical axis of the detection optical system, and outputting a detection signal; an acquisition step of normalizing light intensity in which the formed angle is in a predetermined range with light intensity in which the formed angle is 0°, on the basis of an angle-dependent distribution of the light intensity obtained from the detection signal, and acquiring the normalized angle-dependent distribution of the light intensity; a specifying step of specifying light intensity in a maximum area present between an angle at which the light intensity is minimized and 90° on the basis of the normalized angle-dependent distribution of the light intensity; and a calculation step of calculating the orientation parameter on the basis of a linear relationship between light intensity and a value related to the orientation parameter, and the light intensity in the maximum area. The linear relationship is determined using the predetermined film thickness and the predetermined refractive index.

Alternatively, an embodiment of the present invention is an orientation characteristic measurement program. The orientation characteristic measurement program is an orientation characteristic measurement program for calculating an orientation parameter of a sample having a predetermined refractive index and disposed to a predetermined film thickness on a light transmitting substrate, on the basis of a detection signal obtained by detecting detection light using a detection device including an irradiation optical system configured to irradiate the sample with irradiation light, a detection optical system configured to guide the detection light emitted from the sample with the irradiation of the irradiation light, and a light detector configured to detect the detection light while changing a formed angle between a line perpendicular to a surface of the sample on the emitting side of the detection light and an optical axis of the detection optical system, and causes a computer to execute: an acquisition process of normalizing light intensity in which the formed angle is in a predetermined range with light intensity in which the formed angle is 0°, on the basis of an angle-dependent distribution of the light intensity obtained from the detection signal, and acquiring the normalized angle-dependent distribution of the light intensity; a specifying process of specifying light intensity in a maximum area present between an angle at which the light intensity is minimized and 90° on the basis of the normalized angle-dependent distribution of the light intensity; and a calculation process of calculating the orientation parameter on the basis of a linear relationship between light intensity and a value related to the orientation parameter, and the light intensity in the maximum area. The linear relationship is determined using the predetermined film thickness and the predetermined refractive index.

Alternatively, an embodiment of the present invention is an orientation characteristic measurement device. The orientation characteristic measurement device includes an irradiation optical system configured to irradiate a sample having a predetermined refractive index and disposed to a predetermined film thickness on a light transmitting substrate with irradiation light, a detection optical system configured to guide detection light emitted from the sample with the irradiation of the irradiation light, a light detector configured to detect the detection light and output a detection signal, a drive mechanism configured to change an angle between a line perpendicular to a surface of the sample on the light emitting side of the detection light and an optical axis of the detection optical system, a control unit configured to control the drive mechanism so that the formed angle is changed, and a processing device configured to calculate an orientation parameter of the sample on the basis of the detection signal obtained while changing the formed angle, wherein the processing device includes: an acquisition unit configured to normalize light intensity in which the formed angle is in a predetermined range with light intensity in which the formed angle is 0°, on the basis of an angle-dependent distribution of the light intensity obtained from the detection signal, and acquire the normalized angle-dependent distribution of the light intensity; a specifying unit configured to specify light intensity in a maximum area present between an angle at which the light intensity is minimized and 90° on the basis of the normalized angle-dependent distribution of the light intensity; and a calculation unit configured to calculate the orientation parameter on the basis of a linear relationship between light intensity and a value related to the orientation parameter, and the light intensity in the maximum area. The linear relationship is determined using the predetermined film thickness and the predetermined refractive index.

Advantageous Effects of Invention

With the orientation characteristic measurement method, the orientation characteristic measurement program, and the orientation characteristic measurement device according to the embodiment, it is possible to simply measure molecular orientation characteristics of a sample through efficient calculation.

DESCRIPTION OF EMBODIMENTS

Hereinafter, an embodiment of an orientation characteristic measurement method, an orientation characteristic measurement program, and an orientation characteristic measurement device will be described in detail with reference to the accompanying drawings. It should be noted that, in the description, the same elements or elements having the same function will be denoted by the same reference signs and redundant description will be omitted.

(Entire Configuration of Orientation Characteristic Measurement System)

Figure 1:
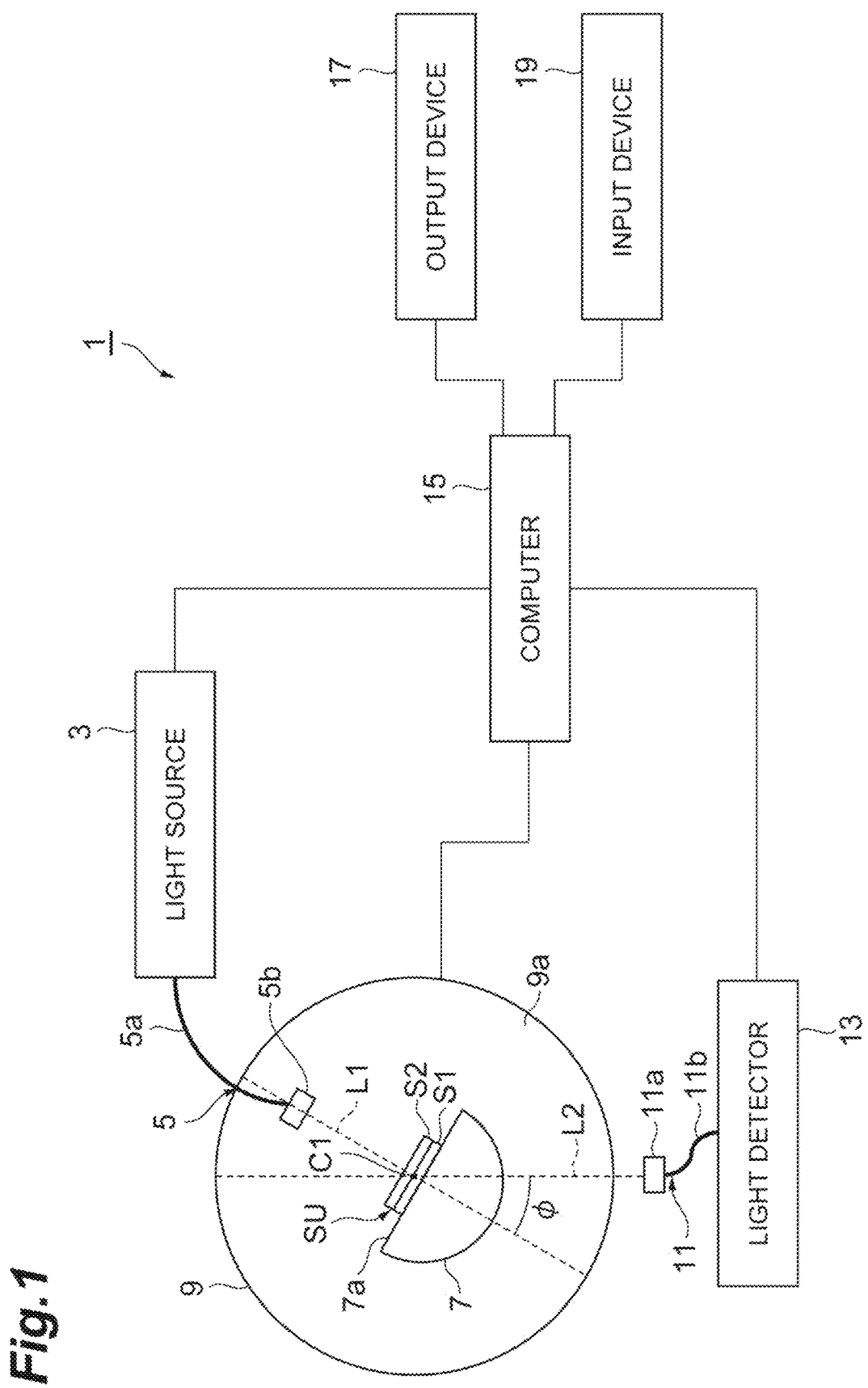
FIG. 1 is a schematic configuration diagram illustrating an orientation characteristic measurement system according to an embodiment.

FIG. 1 is a schematic configuration diagram illustrating an orientation characteristic measurement system that includes an orientation characteristic measurement device and a detection device according to an embodiment. The orientation characteristic measurement system 1 illustrated in FIG. 1 is a system that measures molecular orientation characteristics of an organic material such as an organic EL material, and includes a light source 3, an irradiation optical system 5, a cylindrical lens 7, a rotation mechanism (a drive mechanism) 9, a detection optical system 11, a light detector 13, a computer 15, an output device 17, and an input device 19. It should be noted that a sample SU that is a measurement target in which a material layer S2 made of an organic material that is measurement target of molecular orientation is disposed to a predetermined film thickness on a flat transparent substrate S made of a light transmitting material such as glass, quartz, or a resin material is suitably used. The thickness of the transparent substrate S1 is not limited to the specific thickness and is, for example, about 0.7 mm to 1 mm, and a film thickness of the material layer S2 is, for example, several nm. The material layer S2 is formed on the transparent substrate S1 through vapor deposition or coating.

The light source 3 is a device that irradiates the sample SU for exciting the organic material of the material layer S2 with excitation light (irradiation light) of a predetermined wavelength component. As the light source 3, a laser diode (LD), a light emitting diode (LED), a super luminescent diode (SLD), a lamp light source, or the like may be used. The light source 3 is fixed independently of the rotation mechanism 9 outside the rotation mechanism 9 to be described below.

The irradiation optical system 5 is an optical system that guides the excitation light from the light source 3 so that the sample SU is irradiated with the excitation light, and includes an irradiation optical fiber 5a and an excitation light condensing lens 5b. The irradiation optical fiber 5a has an input end optically coupled to an output of the light source 3 and an output end disposed near the excitation light condensing lens 5b, and causes the excitation light radiated from the light source 3 to be incident on the excitation light condensing lens 5b. The excitation light condensing lens 5b condenses the excitation light near the surface of the transparent substrate S1 on the material layer S2 side in the sample SU. Specifically, the irradiation optical fiber 5a and the excitation light condensing lens 5b are disposed such that a central portion of a surface of the transparent substrate S1 of the sample SU on the material layer S2 side is irradiated with the excitation light along a line perpendicular to the surface.

The cylindrical lens 7 is a substantially semi-cylindrical lens, and a flat surface on the opposite side of a curved surface becomes a disposition surface 7a for disposing the sample SU. That is, in the cylindrical lens 7, the sample SU is fixed onto the disposition surface 7a in a state in which a surface of the sample SU on the transparent substrate S1 side and the disposition surface 7a are optically matched using optical grease. With such a fixed form, no refraction or reflection of light occurs between the transparent substrate S1 and the cylindrical lens 7, and the fluorescent light generated inside the material layer S2 is refracted or reflected only between the material layer S2 and the air and between the material layer S2 and the transparent substrate S1. This cylindrical lens 7 is disposed such that the sample SU is directed in an irradiation direction of the excitation light (that is, to the output side of the excitation light condensing lens 5b), transmits the fluorescent light (detection light) emitted from the sample SU with the irradiation of the excitation light, and emits the transmitted fluorescent light to the detection optical system 11.

The detection optical system 11 is an optical system that guides the fluorescent light emitted from the sample SU to the light detector 13 with the irradiation of the excitation light, and includes an optical unit 11a and a detection optical fiber 11b. The optical unit 11a receives the excitation light emitted from the sample SU and passing through the cylindrical lens 7, extracts a P-polarization component from the excitation light, and condenses the extracted P-polarization component on an input end of the detection optical fiber 11b. This optical unit 11a is disposed such that an optical axis thereof substantially matches an irradiation position of the excitation light in the sample SU. The detection optical fiber 11b has an input end disposed near the optical unit 11a and an output end optically coupled to an input of the light detector 13, and causes the fluorescent light emitted from the optical unit 11a to be incident on the light detector 13. The detection optical system 11 is fixed independently of the rotation mechanism 9 outside the rotation mechanism 9.

The rotation mechanism 9 rotatably supports a part of the irradiation optical system 5 and the cylindrical lens 7 on which the sample SU has been disposed. In detail, the rotation mechanism 9 includes a circular flat disposition surface 9a, and is configured to be rotatable along the disposition surface 9a about a center C1 of the disposition surface 9a as a rotation center. In the rotation mechanism 9, a rotation operation state such as a rotation angle, a rotation speed, and ON/OFF of a rotation operation can be controlled under control from a computer 15 to be described below. The rotation mechanism 9 supports the cylindrical lens 7 so that the surface of the transparent substrate S1 of the sample SU on the material layer S2 side is located near the center C1 of the disposition surface 9a and is substantially perpendicular to the disposition surface 9a. Further, the rotation mechanism 9 supports the output end of the irradiation optical fiber 5a and the excitation light condensing lens 5b so that an optical axis L1 of the excitation light output by the excitation light condensing lens 5b is along a line perpendicular to a surface of the material layer S2 on the transparent substrate S1 side (the fluorescent emitting side). Here, the detection optical system 11 is disposed with respect to the rotation mechanism 9 so that the optical axis L2 of the fluorescent light incident on the optical unit 11a passes near the center C1 of the disposition surface 9a. With such a configuration, the rotation mechanism 9 enables an angle ϕ formed between the optical axis L2 of the fluorescent light that is detected by the light detector 13 and the optical axis L1 of the excitation light that is radiated to the sample SU (a line perpendicular to the surface of the material layer S2 on the fluorescent emitting side) to be changed. More specifically, the rotation mechanism 9 is configured such that the formed angle ϕ can be changed at least in the range of 0° to 90°. It should be noted that, although it is desirable for the sake of efficient detection of fluorescent light for the optical axis L1 and the optical axis L2 to intersect at the center C1 of the disposition surface 9a, it is not necessary for the optical axis L1 and the optical axis L2 to intersect at the center C1 of the disposition surface 9a, and the optical axis L1 and the optical axis L2 may intersect at a position shifted from the center C1 as long as the formed angle can be changed from 0° to 90°.

The light detector 13 detects the fluorescent light guided by the detection optical system 11 and outputs intensity value data (a detection signal) indicating light intensity of the fluorescent light. The light detector 13 is, for example, a spectral detector, splits the fluorescent light into wavelength components to detect spectral spectrum data, and outputs the spectral spectrum data (the intensity value data). In addition, the light detector 13 may be a photodiode such as an avalanche photodiode, or a detector that detects the intensity value data without splitting into wavelength components, such as a photomultiplier.

The computer 15 is a data processing device that executes control of irradiation with the excitation light of the light source 3, control of the rotation operation state of the rotation mechanism 9, or a process of calculating an orientation parameter indicating molecular orientation characteristics on the basis of the detection signal. The computer 15 may be a computing device such as a personal computer, a microcomputer, a cloud server, or a smart device. The output device 17 such as a display or a communication device for displaying (outputting) measurement result data such as the orientation parameter or measurement condition data, and the input device 19 such as a keyboard, a mouse, or a touch panel for receiving data such as measurement conditions from a user are electrically connected to the computer 15.

Figure 2:
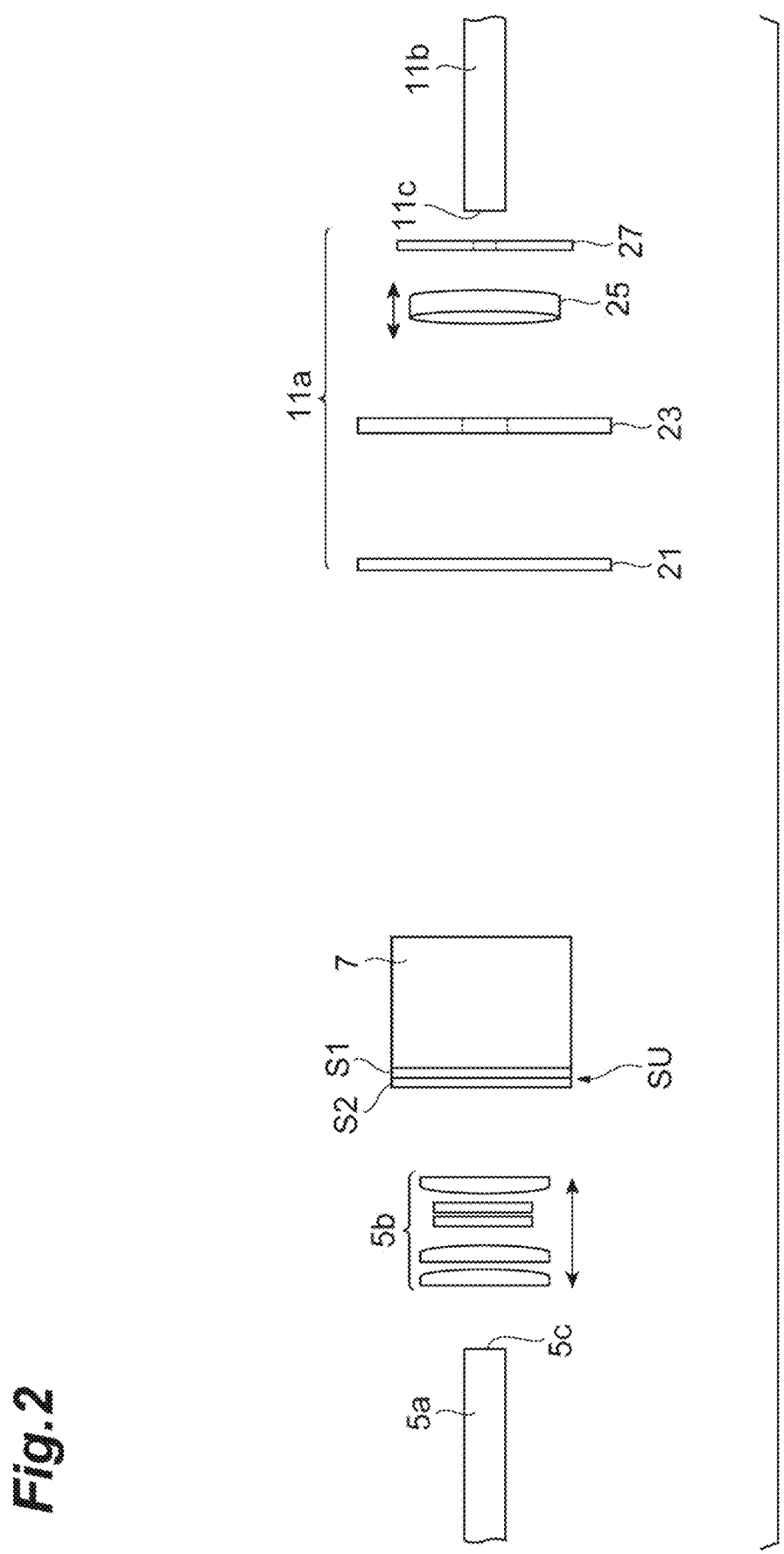
FIG. 2 is a diagram illustrating a detailed configuration of an optical system of the orientation characteristic measurement system of FIG. 1.

FIG. 2 illustrates a disposition state when viewed from a direction along the disposition surface 9a of the optical system in the orientation characteristic measurement system 1. Here, a case in which the angle ϕ between the optical axes L1 and L2 is set to 0° is shown. As illustrated in FIG. 2, the excitation light condensing lens 5b constituting the irradiation optical system 5 includes a condensing lens group disposed near an output end 5c of the irradiation optical fiber 5a. A part or all of the condensing lens group includes a mechanism capable of adjusting a focal position of the excitation light so that the focal position of the excitation light matches a position of the sample SU. Further, the optical unit 11a of the detection optical system 11 includes a polarizer 21, a diaphragm 23, a detection light condensing lens 25, and a diaphragm 27 sequentially disposed from the cylindrical lens 7 side to the input end 11c side of the detection optical fiber 11b. The polarizer 21 passes only the P-polarization component of the fluorescent light generated from the sample SU. It should be noted that the polarizer 21 is not limited to the polarizer passing the P-polarization component, but may be a polarizer that passes an S-polarization component or other polarization components. Further, the polarizer 21 may be a polarization beam splitter. The diaphragm 23 restricts a luminous flux of the fluorescent light having passed through the polarizer 21 and passes the fluorescent light having the narrowed luminous flux toward the detection light condensing lens 25. The detection light condensing lens 25 causes the fluorescent light of which the luminous flux has been narrowed down by passing through the diaphragm 23 to be incident on the input end 11c of the detection optical fiber 11b. The diaphragm 27 narrows down the luminous flux of the fluorescent light condensed by the detection light condensing lens 25 and causes the fluorescent light to be incident on the input end 11c of the detection optical fiber 11b. Here, the detection light condensing lens 25 includes a mechanism capable of adjusting a position of the detection light condensing lens 25 so that a focal position of the detection light condensing lens 25 matches the position of the sample SU.

(Configuration of Computer System)

Next, a detailed configuration of the computer 15 including the output device 17 and the input device 19 will be described.

Figure 3:
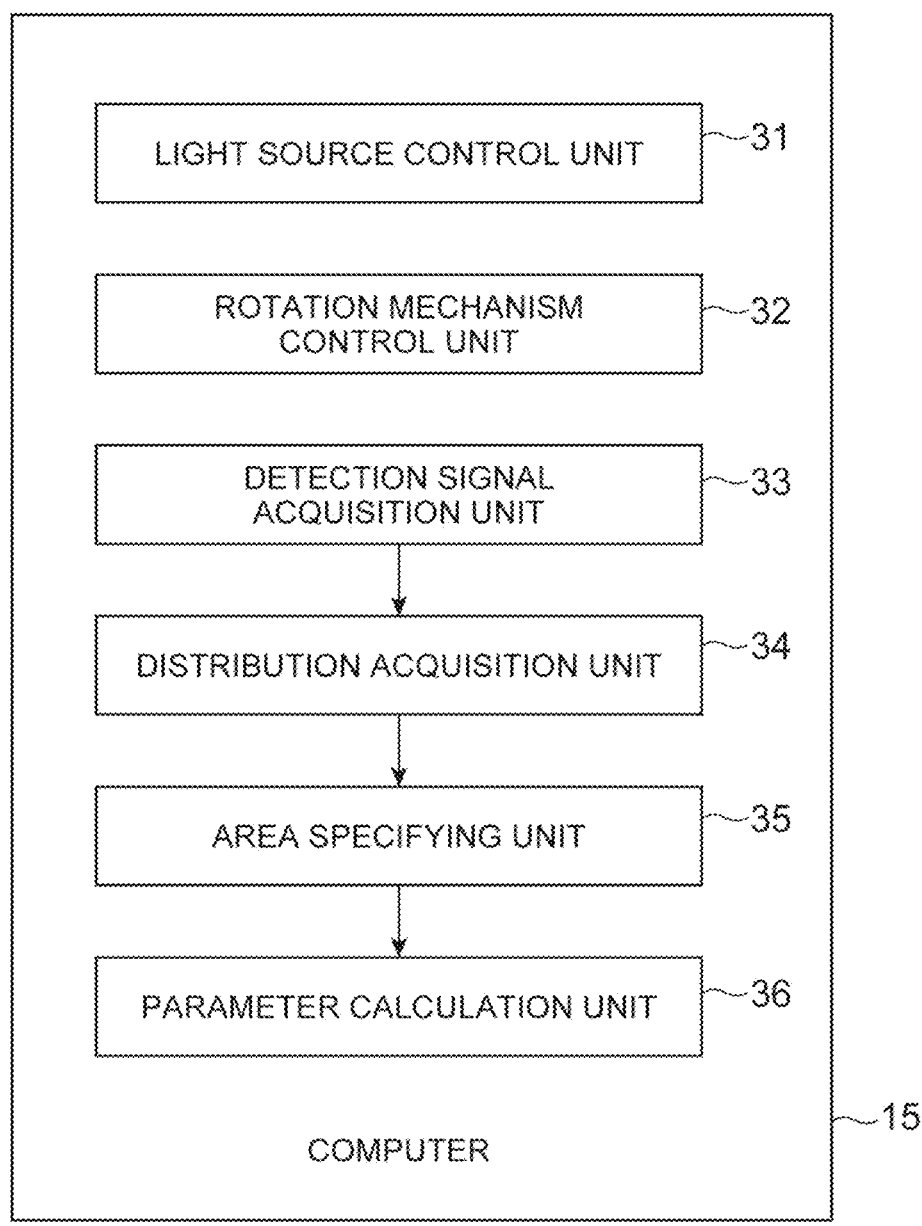
FIG. 3 is a block diagram illustrating a functional configuration of a computer of FIG. 1.
Figure 4:
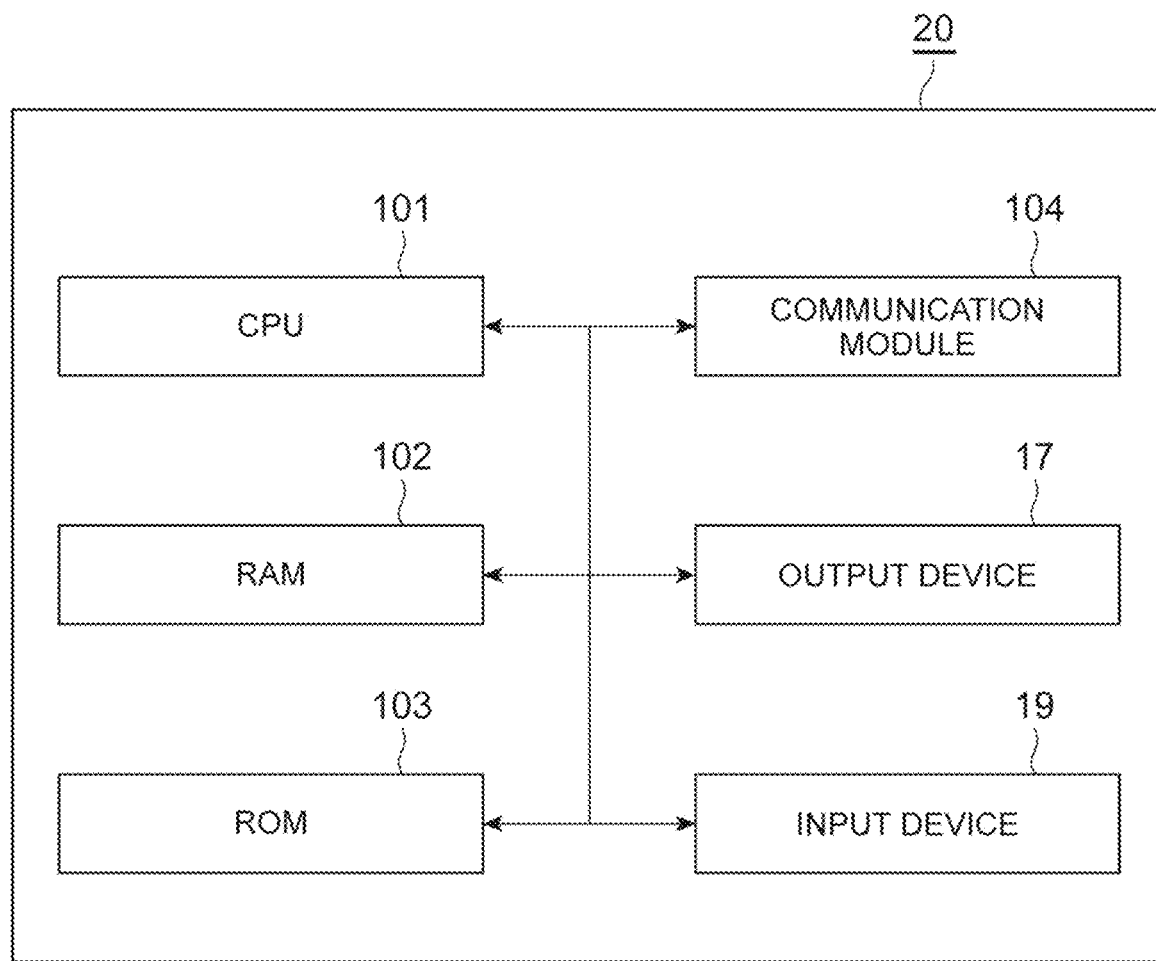
FIG. 4 is a block diagram illustrating a hardware configuration of a computer system including the computer of FIG. 1.

FIG. 3 is a functional block diagram of the computer 15, and FIG. 4 is a diagram illustrating a hardware configuration of the computer system 20 including the computer 15, the output device 17, and the input device 19.

As illustrated in FIG. 3, the computer 15 includes, as functional components, a light source control unit 31, a rotation mechanism control unit (a control unit) 32, a detection signal acquisition unit 33, a distribution acquisition unit (an acquisition unit) 34, an area specifying unit (a specifying unit) 35, and a parameter calculation unit 36. As illustrated in FIG. 4, the computer system 20 including the computer 15 physically includes a central processing unit (CPU) 101, a random access memory (RAM) 102 or a read only memory (ROM) 103 that is a recording medium, a communication module 104, an output device 17, and an input device 19. The respective functional units of the computer 15 described above are realized by loading the orientation characteristic measurement program according to the embodiment into hardware such as the CPU 101 and the RAM 102 to operate the communication module 104, the output device 17, the input device 19, and the like under the control of the CPU 101, and to perform reading and writing of data in the RAM 102 and reading of data from the ROM 103 under the control of the CPU 101. That is, the orientation characteristic measurement program of the embodiment causes the computer system 20 to function as the light source control unit 31, the rotation mechanism control unit 32, the detection signal acquisition unit 33, the distribution acquisition unit 34, the area specifying unit 35, and the parameter calculation unit (a calculation unit, a selection unit, and a determination unit) 36.

Hereinafter, a detailed function of each functional unit of the computer 15 will be described.

The light source control unit 31 performs control so that an operation of the light source 3 is started and excitation light is radiated on the basis of reception of a measurement start instruction from the user via the input device 19, and controls the light source 3 so that the irradiation with the excitation light is stopped after a fluorescent light measurement process ends. The rotation mechanism control unit 32 controls the rotation operation state of the rotation mechanism 9 in synchronization with the control of the irradiation with the excitation light of the light source control unit 31 (a control process). Specifically, the rotation mechanism control unit 32 performs control so that the angle $\phi$ formed between the optical axis L1 of the irradiation optical system 5 and the optical axis L2 of the detection optical system 11 is changed between 0° and 90°. In this case, the formed angle $\phi$ may be changed in a stepwise manner, or the formed angle $\phi$ may be changed continuously at a predetermined change rate.

The detection signal acquisition unit 33 continuously acquires the intensity value data indicating the light intensity of the fluorescent light output from the light detector 13 while the irradiation with the excitation light is started by the light source control unit 31 and the formed angle $\phi$ is changed between 0° and 90° by the rotation mechanism control unit 32. The distribution acquisition unit 34 generates light intensity distribution data $I(\phi)$ indicating a light intensity distribution (an angle-dependent distribution) of the fluorescent light with respect to the formed angle $\phi$ on the basis of the intensity value data for each formed angle $\phi$ acquired by the detection signal acquisition unit 33. In this case, when the distribution acquisition unit 34 acquires the spectral spectrum data as the intensity value data, the distribution acquisition unit 34 converts the spectral spectrum data into intensity value data indicating the light intensity over an entire wavelength range, executes the conversion into the intensity value data for each angle $\phi$, and generates the light intensity distribution data $I(\phi)$ that is a distribution of light intensity for each angle $\phi$ on the basis of the intensity value data after conversion. The distribution acquisition unit 34 normalizes an intensity value in which the formed angle $\phi$ is in a predetermined range (for example, 0°<$\phi$≤90°) with an intensity value in which the formed angle $\phi$ is 0° for the generated light intensity distribution data $I(\phi)$ to acquire normalized light intensity distribution data $I_N(\phi)$ (an acquisition process).

Figure 5:
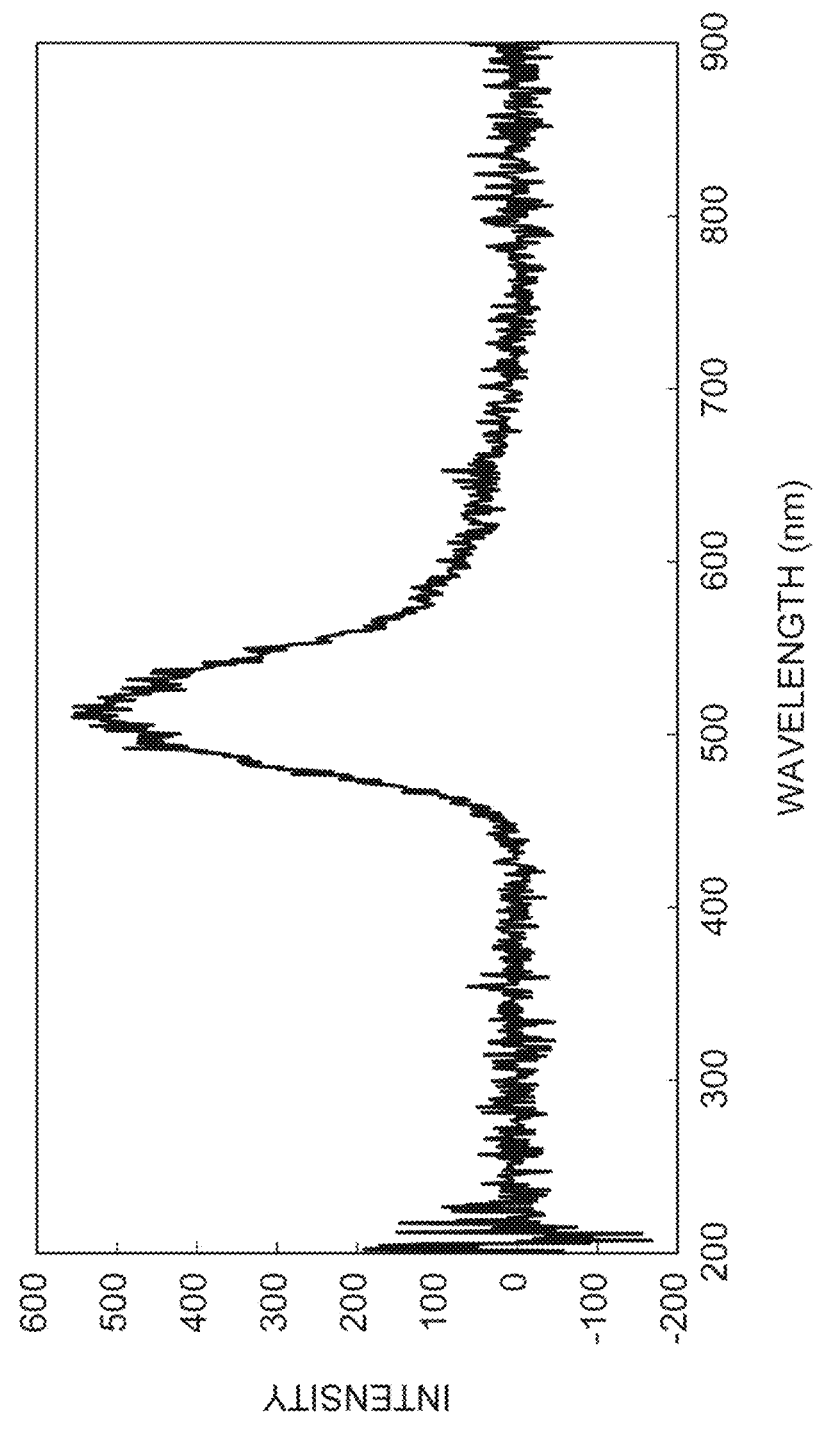
FIG. 5 is a graph illustrating an example of a spectral spectrum data value acquired by a detection signal acquisition unit 33 of FIG. 3.
Figure 6:
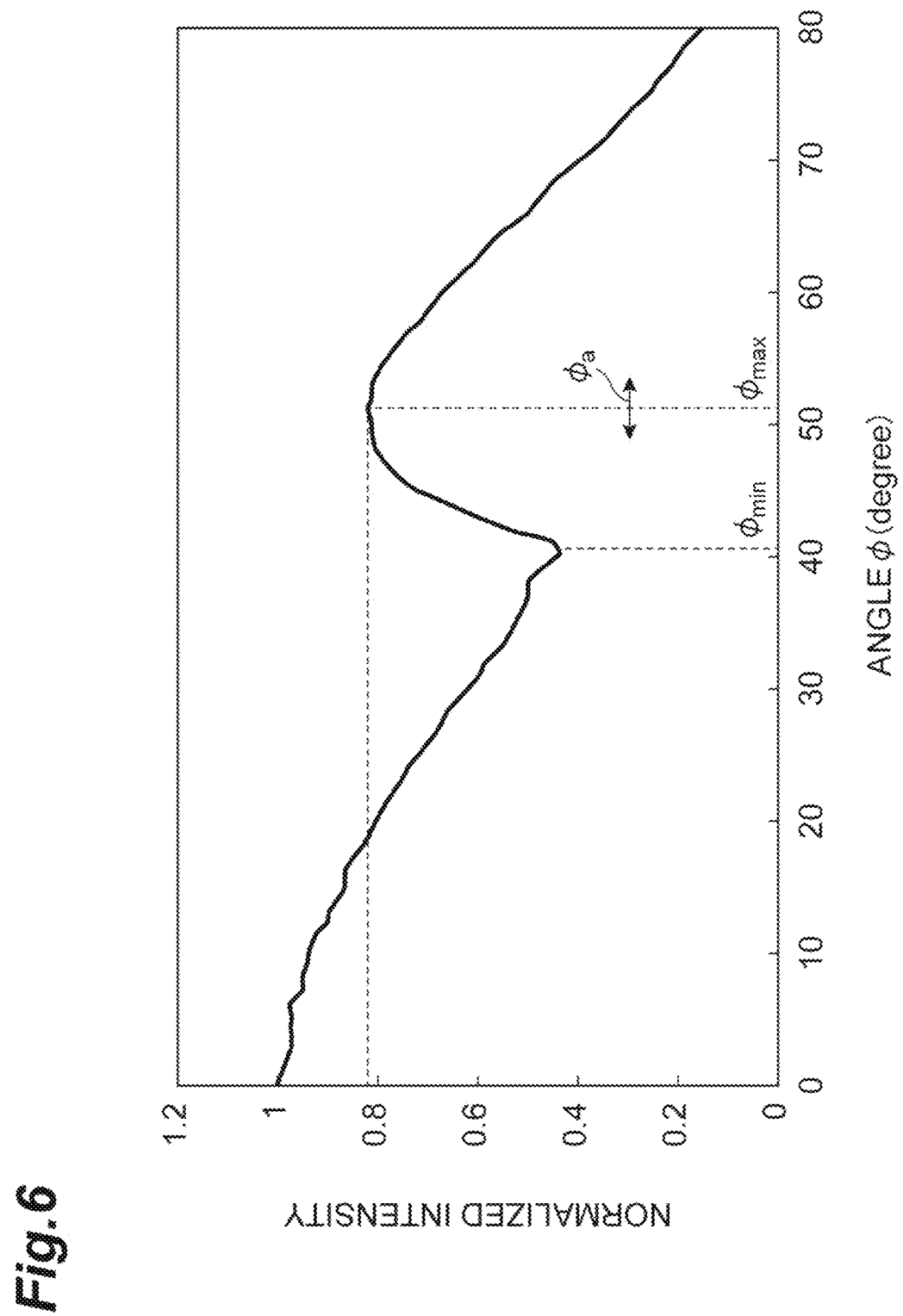
FIG. 6 is a graph illustrating an example of light intensity distribution data generated by a distribution acquisition unit 34 of FIG. 3.

FIG. 5 illustrates an example of a value of spectral spectrum data acquired by the detection signal acquisition unit 33, and FIG. 6 illustrates an example of the light intensity distribution data $I_N(\phi)$ generated by the distribution acquisition unit 34. The intensity value data of the fluorescent light is obtained through integration in a wavelength range in which the spectral spectrum data (FIG. 6) indicating the wavelength characteristics of the light intensity of the fluorescent light acquired by the detection signal acquisition unit 33 has a significant value, and this intensity value data is repeatedly calculated for a plurality of pieces of spectral spectrum data in a range in which the formed angle $\phi$ is 0° to 90°. The normalized light intensity distribution data $I_N(\phi)$ (FIG. 6) is acquired by normalizing the intensity value in which the formed angle $\phi$ is in the range of 0° to 90° with the intensity value of the formed angle $\phi$=0°. In general, the light intensity distribution obtained for the organic material has characteristics that the light intensity distribution decreases as the angle $\phi$ increases from 0°, has a minimum value at a certain angle (about 40° in the case of FIG. 6), and has a maximum value at an angle larger than an angle at the minimum value (about 50° in the case of FIG. 6), as illustrated in FIG. 6.

The area specifying unit 35 specifies the light intensity in the area in which the intensity value is maximized, on the basis of the light intensity distribution data $I_N(\phi)$ generated by the distribution acquisition unit 34 (a specifying process). That is, when the light intensity distribution data $I_N(\phi)$ as illustrated in FIG. 6 is a target, the area specifying unit 35 specifies light intensity $I_{Npeak}$ of the angle $\phi_a$ of a maximum area present between an angle $\phi_{min}$ at which the intensity value in the light intensity distribution data $I_{Npeak}(\phi)$ is minimized and an angle of 90°. The light intensity $I_{Npeak}$ of the angle $\phi_a$ of the maximum area may be light intensity of an angle $\phi_{max}$ corresponding to the maximum value, may be light intensity at an angle in a predetermined angle range (for example, in a range of ±5°) from the angle $\phi_{max}$, or may be a minimum value, a maximum value, an average value, an intermediate value, or the like of the light intensity in the predetermined angle range.

The parameter calculation unit 36 calculates an orientation parameter indicating the molecular orientation characteristics of the organic material of the material layer S2 of the sample SU by referring to a value of the light intensity $I_{Npeak}$ of the angle $\phi_a$ of the maximum area specified by the area specifying unit 35 and data for specifying the linear relationship determined in advance and stored in the computer 15 (a calculation process).

Here, a principle of calculation of the orientation parameter based on the light intensity distribution data $I_N(\phi)$ will be described prior to a detailed function of the parameter calculation unit 36.

In the previous research, a case in which UV light is caused to be incident perpendicularly to a surface of a sample made of an isotropic fluorescent material from the side opposite to a semi-cylindrical lens in a state in which the sample is disposed on a flat surface of the semi-cylindrical lens as in the orientation characteristic measurement system 1 is assumed, and in this case, a light intensity distribution of a P-polarization component of fluorescent light emitted from the semi-cylindrical lens side is formulated. This study is described in literature of the related art ("New method for determining refractive index and thickness of fluorescent thin films," OPTICS COMMUNICATIONS, Volume 31, Number 3, December 1979). Specifically, using a term $Q^P$ indicating an influence of interference between direct light from a light emitting point within a layer of the sample on the semi-cylindrical lens and one time reflected light within a film of the sample, a term $M^P$ indicating an influence of interference between the direct light from the light emitting point within the layer of the sample and multiple reflected light within a film of the sample, and a term $T^P$ dependent on an observation angle and an observation wavelength of the fluorescent light, a light intensity distribution $P_P$ of the P-polarization component is expressed by the following equation:

$$P^P = Q^P M^P T^P$$

According to this literature of the related art, the light intensity distribution $P^P$ of the P-polarization component is formulated by the following equation:

$$P^P = \frac{1}{2\pi} \frac{n_1}{n_0} \cos^2\alpha_1 \times \begin{cases} \frac{[(n_2/n_0)^4 - 1]n^{-2}\sin^2\alpha_1 + 1}{(n\cos\alpha_1 + \cos\alpha_2)^2} \\ \frac{[(n_2/n_0)^4 + 1]n^{-2}\sin^2\alpha_1 - 1}{(1 - n^2)[(1 + n^{-2})\sin^2\alpha_1 - 1]} \end{cases} \quad [\text{Math. 1}]$$

In the above equation, $n_1$ denotes a refractive index of the semi-cylindrical lens, $n_2$ denotes a refractive index of a space around the semi-cylindrical lens and the sample, $n_0$ denotes a refractive index of the sample, n is a value equal to $n_2/n_1$, $\alpha_1$ is an angle (corresponding to the formed angle $\phi$) formed between an irradiation direction of the excitation light and an emission direction of the fluorescent light that is an observation target, and $\alpha_2$ indicates an angle determined by $n \cdot \sin\alpha_2 = \sin\alpha_1$. Further, the upper portion of the above equation indicates characteristics when the angle $\alpha_1$ is equal to or smaller than a critical angle, and the lower portion indicates characteristics when the angle $\alpha_1$ is larger than the critical angle.

Figure 7:
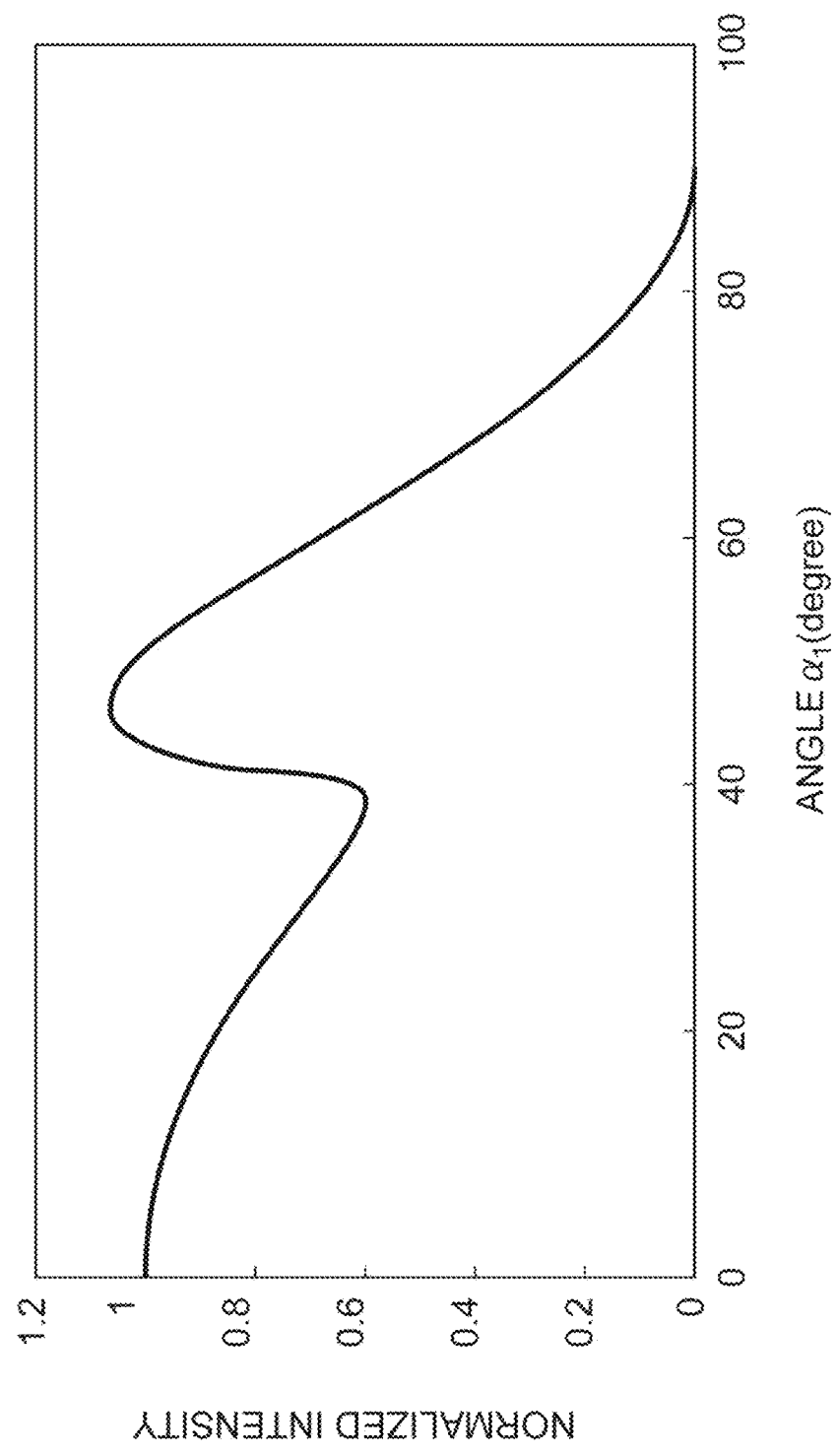
FIG. 7 is a graph illustrating a light intensity distribution obtained through formulation in a literature of the related art.
Figure 8:
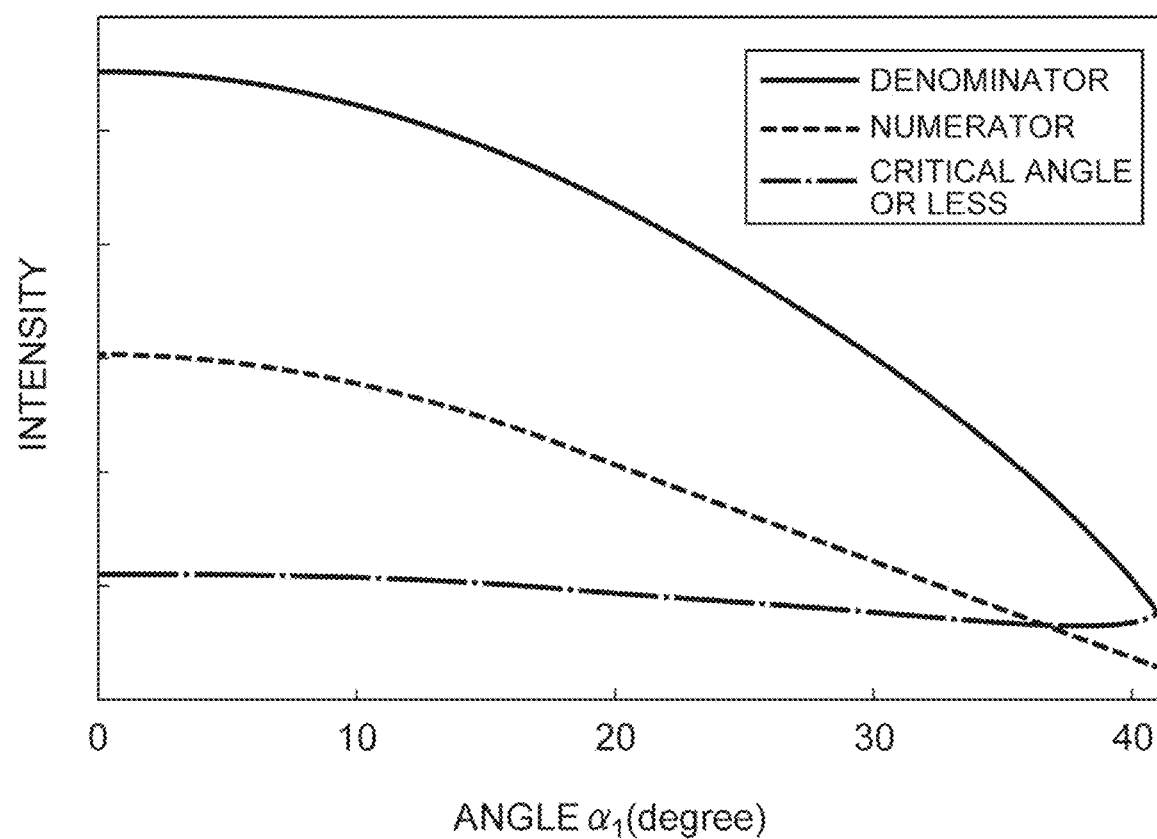
FIG. 8 is a graph illustrating a light intensity distribution according to an equation when an observation angle $\alpha_1$ is equal to or smaller than a critical angle.
Figure 9:
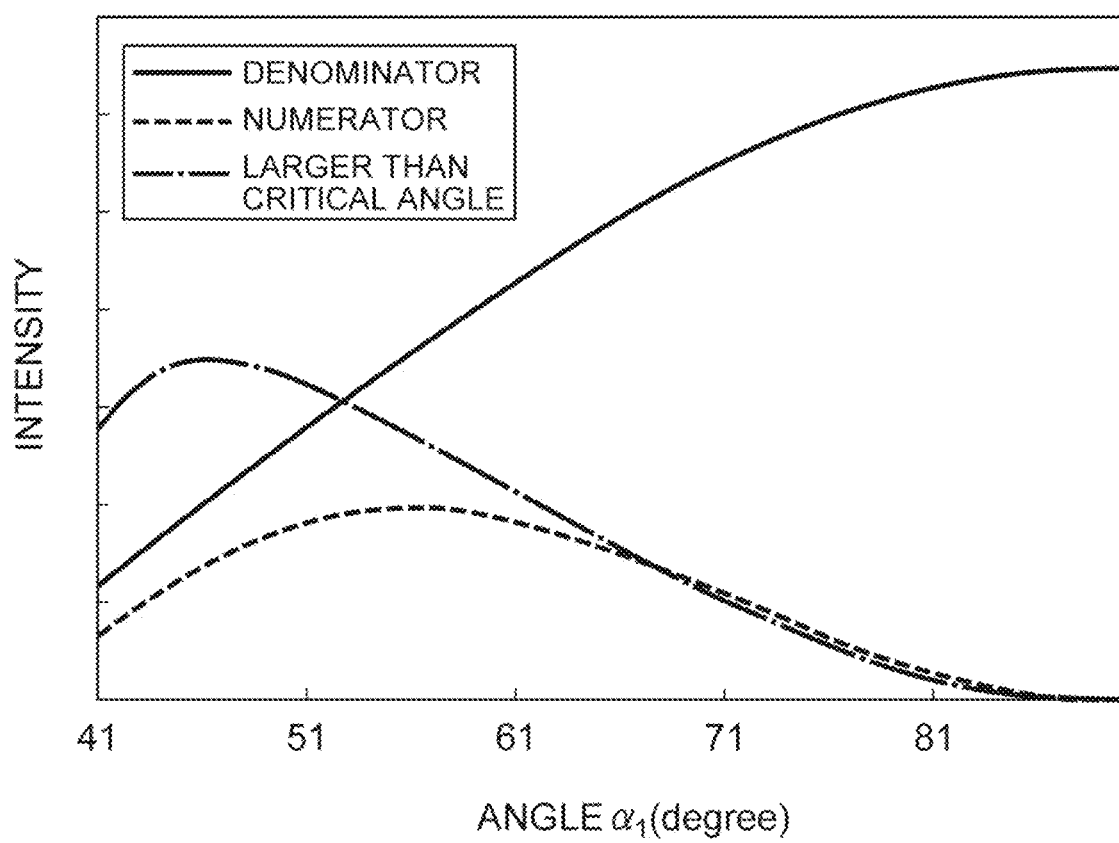
FIG. 9 is a graph illustrating a light intensity distribution according to an equation when the observation angle $\alpha_1$ is larger than the critical angle.

FIG. 7 illustrates a light intensity distribution obtained through formulation in the literature of the related art, FIG. 8 illustrates a light intensity distribution according to the equation when the angle $\alpha_1$ is equal to or smaller than the critical angle, and FIG. 9 illustrates a light intensity distribution according to the equation when the angle $\alpha_1$ is larger than the critical angle. It should be noted that these light intensity distributions have been calculated at the refractive index $n_1=1.516$, the refractive index $n_2=1$, and the refractive index $n_0=1.575$, and in the light intensity distribution illustrated in FIG. 7, the angle $\alpha_1$ is normalized by a value of 0°. As illustrated in FIG. 8, for a value of the equation when the angle $\alpha_1$ is equal to or smaller than the critical angle, the intensity gradually decreases as the angle $\alpha_1$ increases from 0°, and is minimized around 40°. On the other hand, as illustrated in FIG. 9, a value of the equation when the angle $\alpha_1$ is larger than the critical angle is maximized when the angle $\alpha_1$ is between 40° and 50°, and decreases monotonously as the angle increases in a range in which the angle exceeds 50°. An entire light intensity distribution obtained by combining these characteristics has a minimum value when the angle $\alpha_1$ is about 40° and a maximum value when the angle $\alpha_1$ is between 40° and 50°, as illustrated in FIG. 7. Thus, the light intensity distribution obtained through the formulation is similar to the light intensity distribution data $I_N(\phi)$ obtained by the orientation characteristic measurement system 1. However, the sample that is a measurement target of the orientation characteristic measurement system 1 is an organic material having various molecular orientation characteristics, whereas a target of the formulation of the literature of the related art is an isotropic fluorescent material.

A theory of the formulation of the light intensity distribution as described above is described in the literature of the related art ("Light emission by multipole sources in thin layers. I. Radiation patterns of electric and magnetic dipoles", J. Opt. Soc. Am., Vol. 71, No. 6, June 1981).

Figure 10:
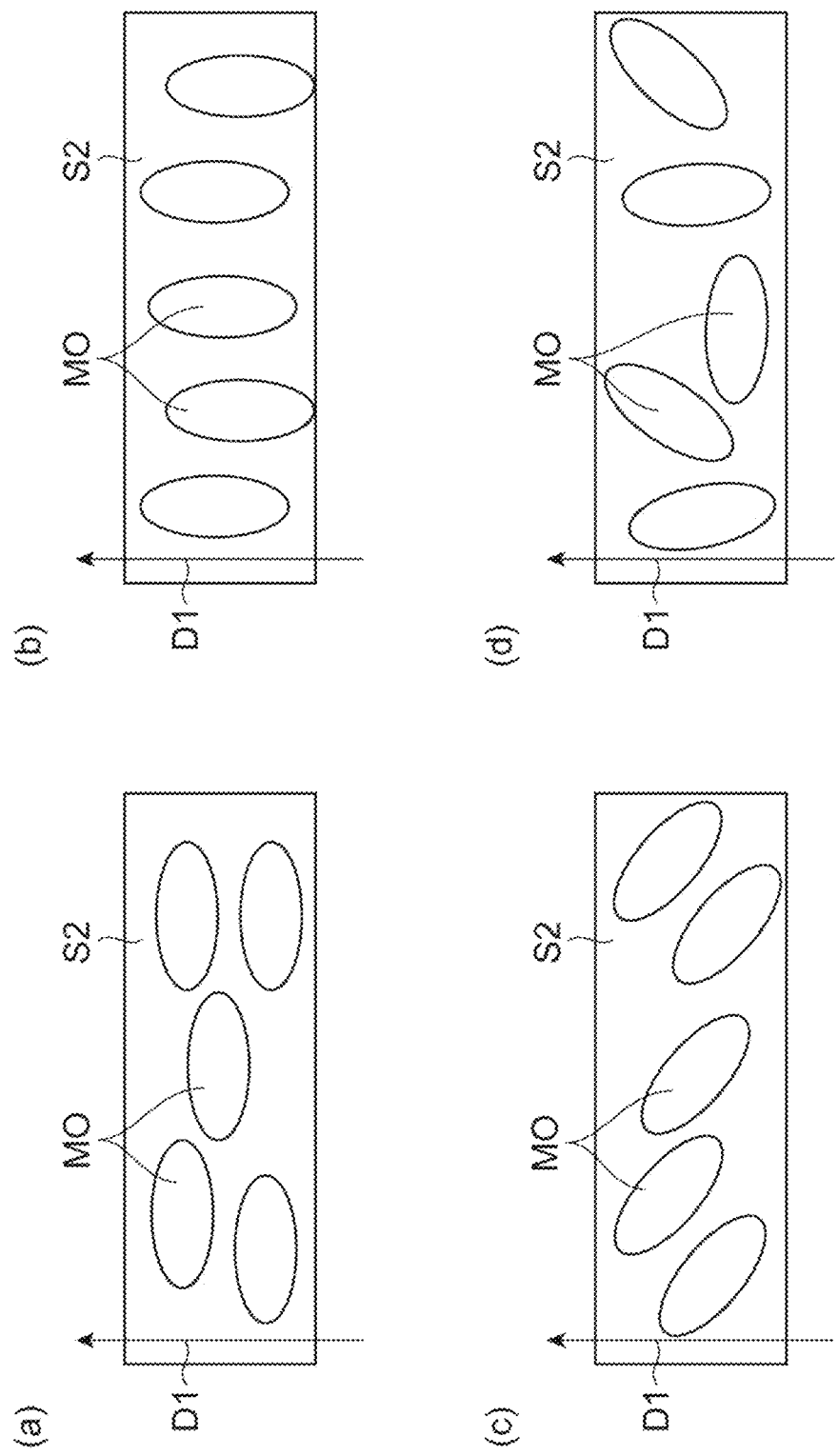
FIG. 10 is a diagram conceptually illustrating an arrangement state of light emitting molecules in a material layer S2 having various molecular orientation characteristics.

Organic materials such as an organic EL that is a measurement target of the orientation characteristic measurement system 1 have different efficiencies of light extraction from the material when molecular orientation characteristics are different. The molecular orientation characteristics are characteristics indicating an orientation in which luminescent molecules are aligned in the material, and there is an orientation parameter S as a parameter indicating such characteristics. FIG. 10 conceptually illustrates an arrangement state of luminescent molecules in the material layer S2 having various molecular orientation characteristics. In the material layer S2 illustrated in part (a) of FIG. 10, luminescent molecules MO are disposed such that dipole moments thereof are at 90° with respect to a thickness direction D1 of the layer. In the material layer S2 illustrated in part (b) of FIG. 10, the luminescent molecules MO are disposed such that the dipole moments thereof are at 0° with respect to a thickness direction D1 of the layer. In the material layer S2 illustrated in part (c) of FIG. 10, the luminescent molecules MO are disposed such that the dipole moments thereof are at 54.7° with respect to a thickness direction D1 of the layer. Further, in the material layer S2 illustrated in part (d) of FIG. 10, the luminescent molecules MO are disposed such that the dipole moments thereof are at a random angle with respect to a thickness direction D1 of the layer. The orientation parameter S for evaluating a molecular orientation state of such a material layer S2 is calculated using the following equation:

$$S = (3/2) \cdot (\cos^2\theta - 1/3)$$

Figure 11:
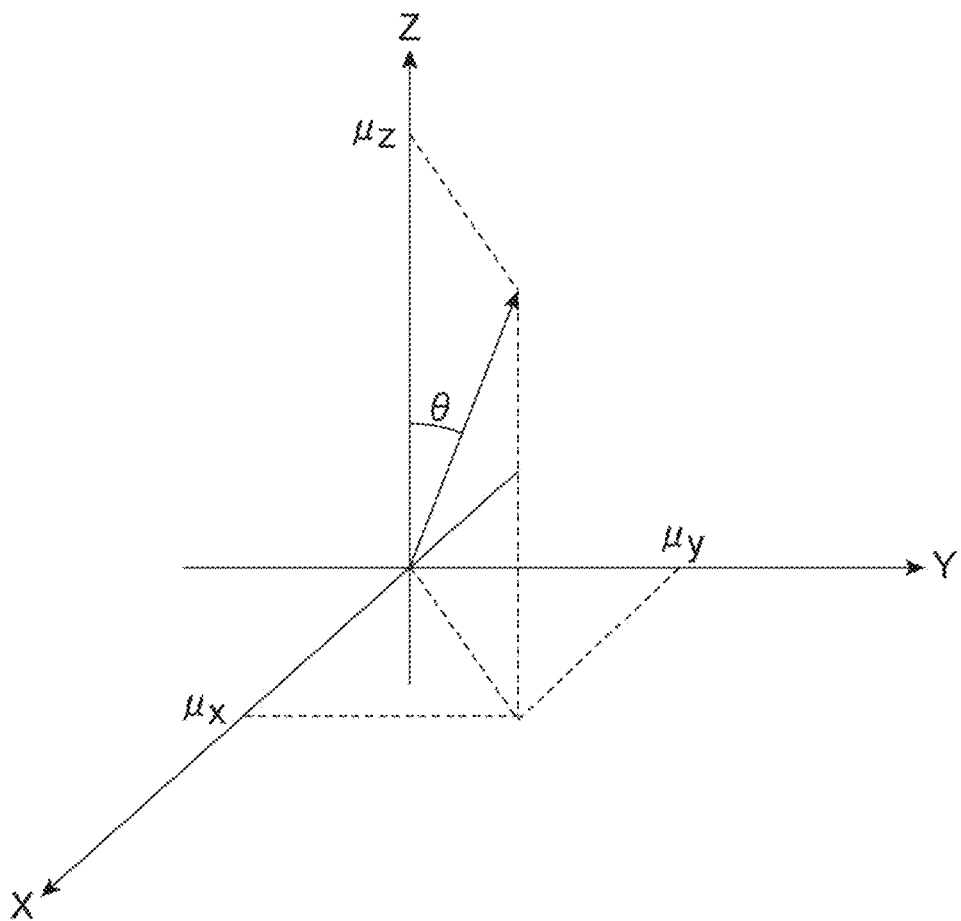
FIG. 11 is a diagram illustrating a relationship between an angle θ of a molecular orientation direction and a thickness direction of the material layer S2.
Figure 12:
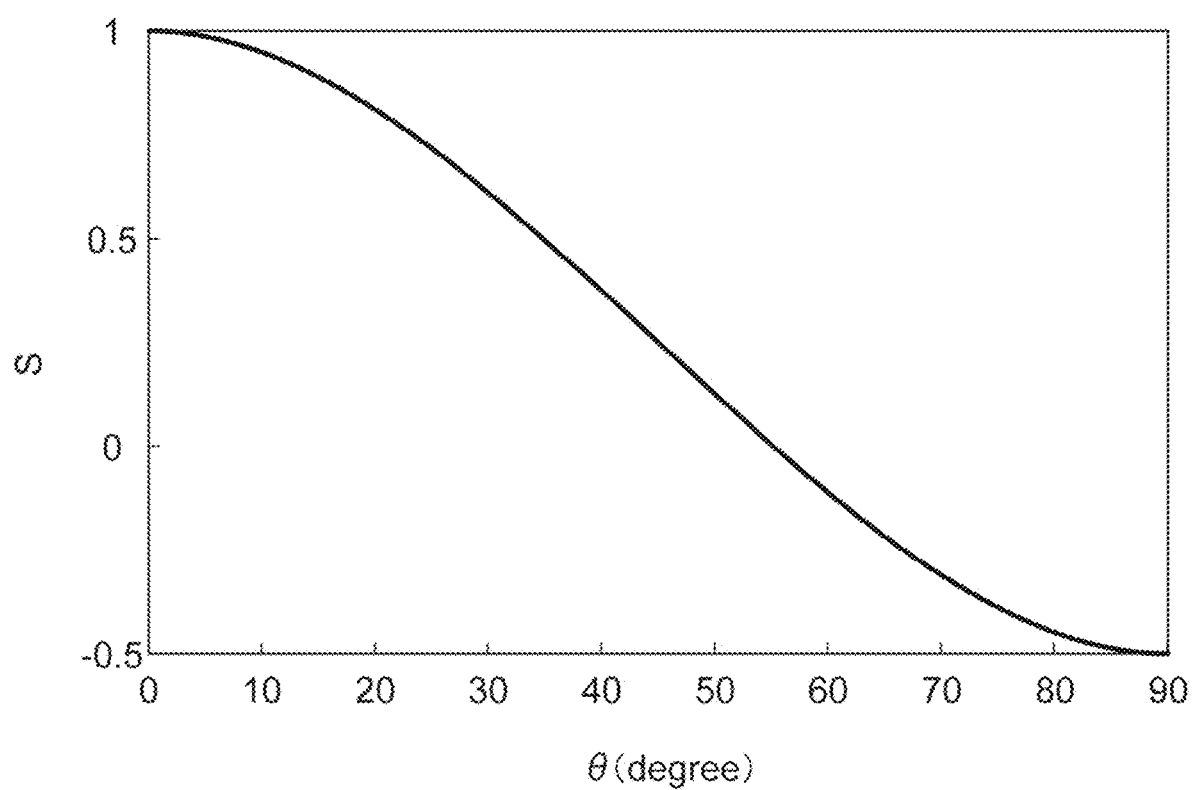
FIG. 12 is a graph illustrating a relationship between the angle θ of the molecular orientation direction and an orientation parameter S.

As illustrated in FIG. 11, the angle θ in the above equation indicates an angle of an average orientation direction (dipole moment) of the luminescent molecules with respect to a Z axis along the thickness direction D1, and this orientation direction has an X component $\mu_x$, a Y component $\mu_y$, and a Z component $\mu_z$. An X axis and a Y axis illustrated in FIG. 11 are axes perpendicular to the thickness direction of the material layer S2. For example, the orientation parameter S of the material layer S2 in the state illustrated in part (a) of FIG. 10 is S=−0.5, the orientation parameter S of the material layer S2 in the state illustrated in part (b) of FIG. 10 is S=1, and the orientation parameter S of the material layer S2 in the state illustrated in part (c) and (d) of FIG. 10 is S=0. FIG. 12 illustrates a relationship between the angle θ and the orientation parameter S. Thus, the orientation parameter S decreases as the angle θ changes from 0° to 90°, with the maximum value being 1 and the minimum value being −0.5. This means that the light extraction efficiency is higher as the orientation parameter S becomes smaller.

Figure 13:
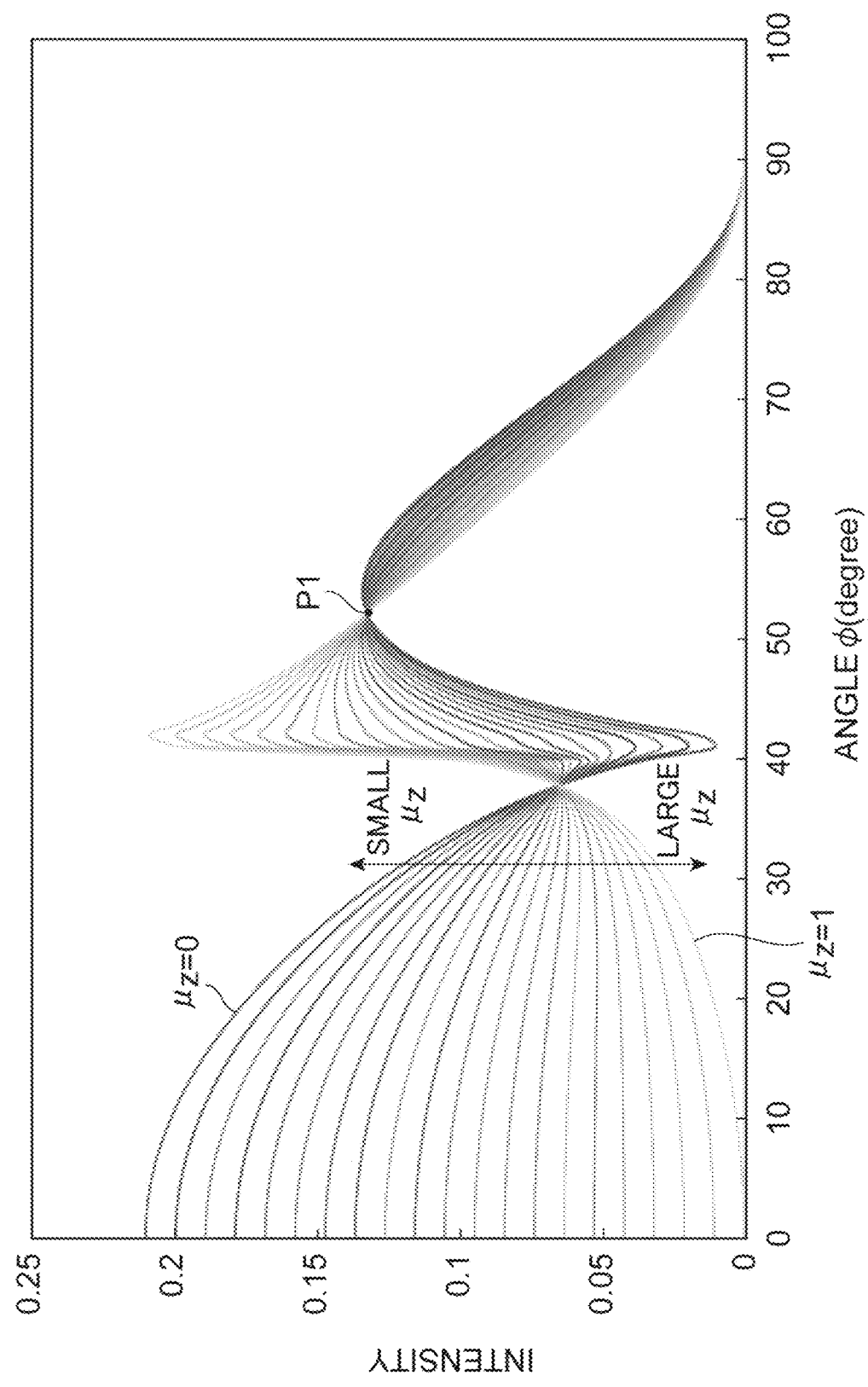
FIG. 13 is a graph illustrating a simulation result of angle-dependent characteristics of light intensity of fluorescent light in a scheme of the related art.

In another document ("Electroluminescence from completely horizontally oriented dyed molecules", APPLIED PHYSICS LETTERS 108, 241106 (2016)), a scheme of determining an orientation parameter S on the basis of angle-dependent characteristics of light intensity of fluorescent light from an organic material layer using the fact that the angle-dependent characteristics differ depending on molecular orientation characteristics has been studied. Specifically, the orientation parameter S of the organic EL material is determined by comparing a measurement result regarding angle-dependent characteristics of a p-polarization component of a fluorescent light spectrum for an organic EL material with a simulation result of the angle-dependent characteristics. FIG. 13 illustrates a simulation result of angle-dependent characteristics of light intensity in this scheme. The simulation result shows a plurality of angle-dependent characteristics calculated while changing a Z component $\mu_z$ of a dipole moment of a molecule in a range of 0 to 1. Here, an X component $\mu_x$, a Y component $\mu_y$, and a Z component $\mu_z$ of the dipole moment of the molecule are assumed as in the following equations:

$$\mu_x+\mu_y+\mu_z=1,$$

$$\mu_x=\mu_y$$

In the scheme of the related art, the Z-component $\mu_z$ of the dipole moment of the molecule is determined by fitting angle-dependent characteristics of actually measured light intensity of fluorescent light with a plurality of characteristics of the simulation result, and the orientation parameter S has been determined from a value of the Z-component $\mu_z$.

The present inventors paid attention to the angle-dependent characteristics of the light intensity obtained through simulation calculation in the scheme of the related art. As a result, the present inventors have found that there is an equality light emitting point P1 at which the intensity values match regardless of the orientation parameter S between the angle corresponding to the minimum value of the angle-dependent characteristic and 90°, and the intensity value at an angle of 0° changes depending on the Z component $\mu_z$. Further, the present inventors have found that the angle of the equality light emitting point P1 substantially matches the angle of the maximum point of the angle-dependent characteristic after normalization, and a reciprocal of the maximum value of the angle-dependent characteristics after normalization and a value related to the orientation parameter S have a substantially linear relationship. Therefore, the present inventors considered that it is possible to obtain the orientation parameter S on the basis of the angle-dependent characteristics of the light intensity normalized by intensity at an angle of 0° by using such a property.

A function of the parameter calculation unit 36 using the principle described above will be described.

Figure 14:
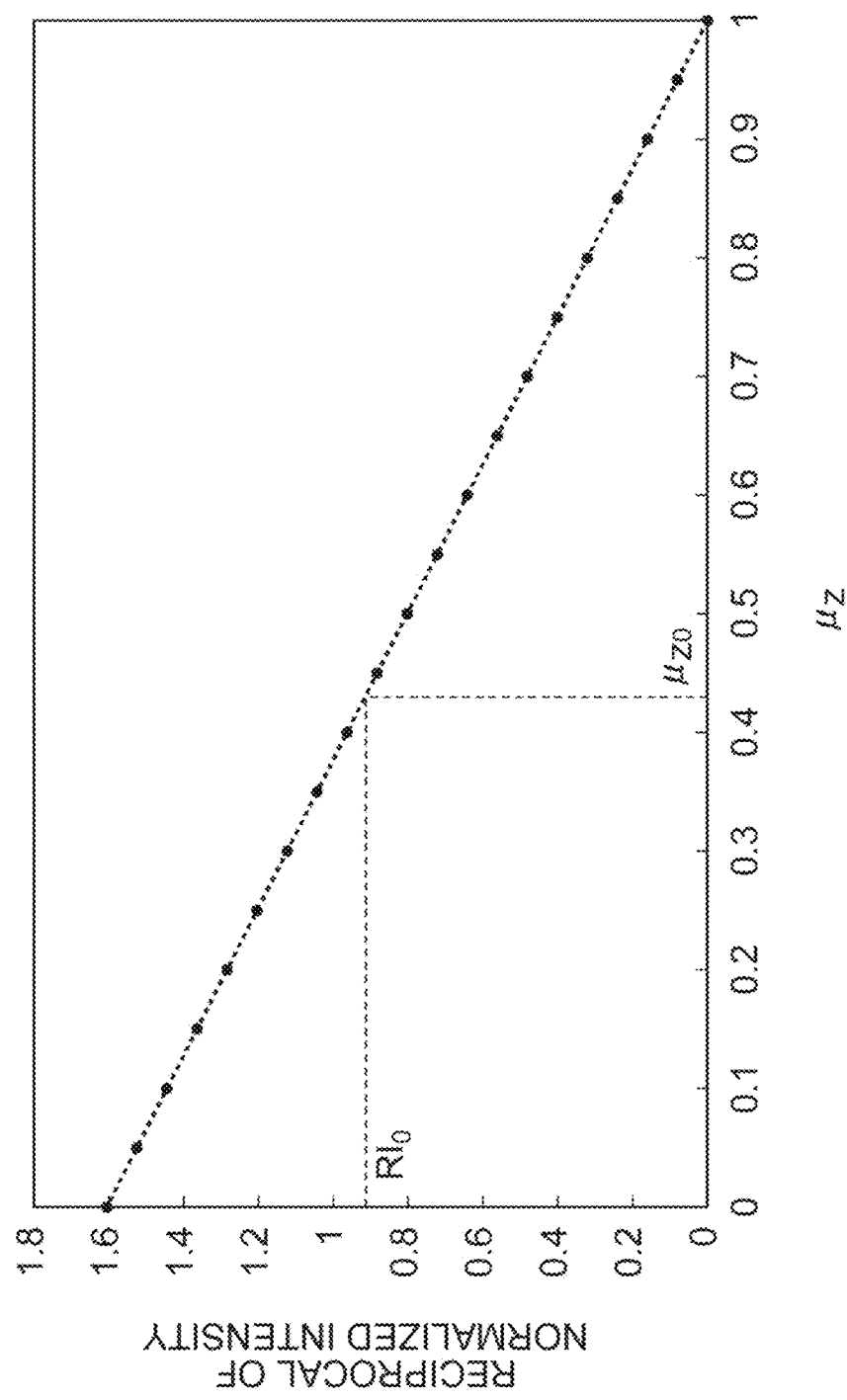
FIG. 14 is a graph illustrating characteristics of data of a linear relationship stored in the computer of FIG. 1.

The parameter calculation unit 36 calculates the orientation parameter S on the basis of data indicating a linear relationship between the light intensity and the Z component $\mu_z$ that is a value related to the orientation parameter S, which is determined using the film thickness of the material layer S2 that is a measurement target and the refractive index of the material layer S2, and the light intensity $I_{Npeak}$ of the maximum area specified by the area specifying unit 35. In the computer 15, the data indicating the linear relationship is stored in a data storage unit such as the ROM 103 in advance. FIG. 14 illustrates characteristics of the data indicating the linear relationship stored in the computer 15. Thus, it is possible to identify the linear correspondence between the Z component $\mu_z$ and the inverse number of the maximum value of the angle dependent characteristic after normalization by the data indicating linear data. A form of the data indicating the linear relationship stored in the computer 15 may be an equation itself or may be a coefficient A itself when a relationship between the Z component $\mu_z$ and a reciprocal RI of the maximum value is expressed by the following equation:

$$RI=A\cdot\mu_z+A,$$

or may be a combination of data of coordinate values at a plurality of sample points on a linear equation as plotted in FIG. 14. Such data indicating the linear relationship is calculated using the simulation result of the angle-depended characteristics of light intensity that are executed for various orientation parameters S in advance, and is calculated for each combination of the film thickness of the material that is a measurement target and a refractive index of the material, and a plurality of pieces of the data are stored in advance. The parameter calculation unit 36 selects (determines) data indicating a linear relationship used for calculation of the orientation parameter S from among data indicating a plurality of linear relationships stored in advance, on the basis of values regarding the film thickness of the material layer S2 that is a measurement target and the refractive index of the material layer S2, which have been input from the user via the input device 19 (a selection process and a determination process). The parameter calculation unit 36 specifies the Z component $\mu_z$ on the basis of the data and the light intensity $I_{Npeak}$ of the maximum area specified by the area specifying unit 35. Specifically, when the selected linear relationship is the characteristic as illustrated in FIG. 14 and the reciprocal of the light intensity $I_{Npeak}$ in the maximum area has been calculated as $RI_0=1/I_{Npeak}$, a Z component $\mu_{z0}$ having the linear relationship illustrated in FIG. 14 with the reciprocal $RI_0$ is derived as the Z component $\mu_z$ of the dipole moment of the material layer S2.

Further, the parameter calculation unit 36 calculates the orientation parameter S using the following equation:

$$S=\{\mu_z^2-(\tfrac{1}{4})(1-\mu_z)^2\}/\{\mu_z^2+(\tfrac{1}{2})(1-\mu_z)^2\}$$

using the fact that the X component $\mu_x$, the Y component $\mu_y$, and the Z component $\mu_z$ of the dipole moment of the molecule have a relationship indicated by the following equations:

$$\mu_x+\mu_y+\mu_z=1, \text{ and}$$

$$\mu_x=\mu_y,$$

and the orientation parameter S is defined by the following equation:

$$S=(\mu_z^2-\mu_x^2)/(\mu_z^2+2\mu_x^2).$$

The parameter calculation unit 36 outputs the calculated orientation parameter S to the output device 17. Here, the parameter calculation unit 36 may transmit the calculated orientation parameter S to the outside via the communication module 104 and the network.

(Description of Each Step of Orientation Characteristics Measurement Method)

Figure 15:
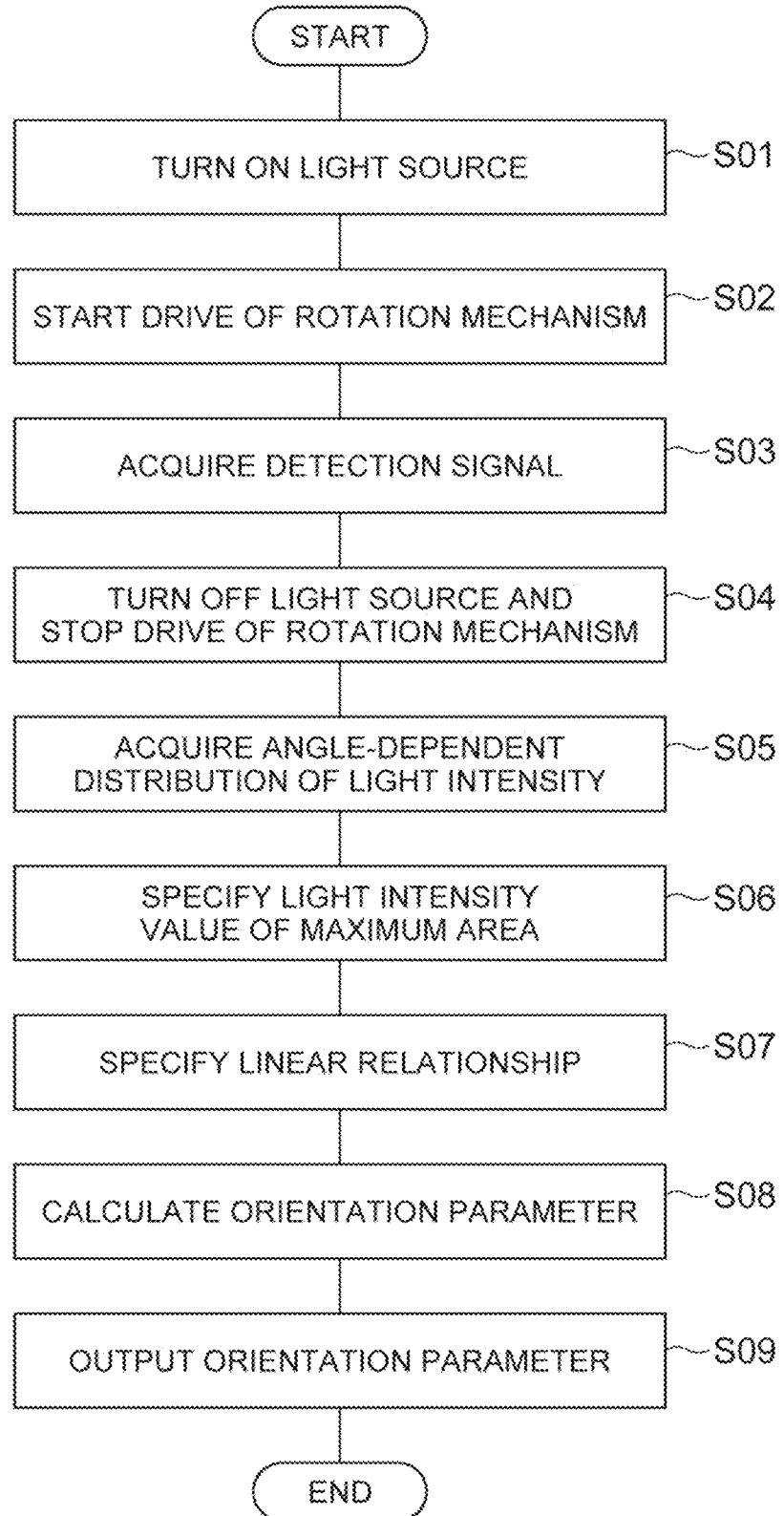
FIG. 15 is a flowchart illustrating an orientation characteristic measurement method according to the embodiment.

Next, an orientation characteristic measurement method that is an operation method (a process that is executed by the computer 15) of the computer 15 according to the embodiment will be described for each process with reference to the flowchart of FIG. 15. FIG. 15 is a flowchart illustrating an orientation characteristic measurement method according to the embodiment.

First, the irradiation with the excitation light from the light source 3 is turned on under the control of the light source control unit 31 on the basis of reception of the measurement start instruction using the input device 19 (step S01). In addition, under the control of the rotation mechanism control unit 32, rotation drive of the rotation mechanism 9 is started, and the angle φ formed between the optical axis L1 of the irradiation optical system 5 and the optical axis L2 of the detection optical system 11 is changed in the range of 0° and 90° (step S02). In response thereto, the detection signal acquisition unit 33 continuously acquires the intensity value data from the light detector 13 (step S03). When the acquisition of the intensity value data at which the formed angle is in the range of 0° to 90° ends, the irradiation with the excitation light from the light source 3 is turned OFF, and the rotational drive of the rotation mechanism 9 is also stopped (step S04).

Thereafter, the distribution acquisition unit 34 generates light intensity distribution data I(φ) that is a distribution of light intensity for each angle φ formed on the basis of the intensity value data acquired in the range of the formed angle φ of 0° to 90°, and normalizes an intensity value of the light intensity distribution data I(φ) with the intensity value in which the formed angle φ is 0° to acquire the light intensity distribution data $I_N(\phi)$ (step S05). Then, the area specifying unit 35 specifies the light intensity $I_{Npeak}$ of the angle $\phi_a$ of the maximum area on the basis of the light intensity distribution data $I_N(\phi)$ (step S06). Further, on the basis of the values regarding the film thickness and the refractive index of the material layer S2 input from the user, the parameter calculation unit 36 specifies a linear coefficient A as a parameter for specifying a linear relationship corresponding to the film thickness and the refractive index (step S07). The parameter calculation unit 36 calculates the Z component $\mu_z$ of the dipole moment of the material layer S2 on the basis of a linear equation expressed by the specified linear coefficient A and the light intensity $I_{Npeak}$ of the angle $\phi_a$ of the maximum area, and further calculates the orientation parameter S on the basis of the Z component $\mu_z$ (step S08). Finally, the calculated orientation parameter S is output to the output device 17, and the orientation characteristic measurement process is ended (step S09).

It should be noted that the present inventors have found that the linear coefficient A can be obtained using a two-dimensional polynomial of the film thickness d and the refractive index n by using a plane fitting method when the refractive index n is in a range of 1.74 or more and 1.91 or less and the film thickness d is in a range of 10 nm or more and 20 nm or less. That is, the linear coefficient A can be expressed by the following equation:

$$A=-A_1d^2n^3+A_2d^2n^2-A_3d^2n+A_4d^2+A_5dn^3-A_6dn^2+A_7dn-A_8d-A_9n^3+A_{10}n^2-A_{11}n+A_{12}$$

It should be noted that $A_n$ (n=1, 2, 3 . . . 12) is a real number. Therefore, in step S07, the parameter calculation unit 36 can specify the linear coefficient A as a parameter for specifying the linear relationship corresponding to the film thickness and the refractive index on the basis of the values regarding the film thickness and the refractive index of the material layer S2 input from the user.

With the orientation characteristic measurement system 1 and the orientation characteristic measurement method using the orientation characteristic measurement system 1 described above, it is possible to obtain the angle-dependent distribution of the light intensity of the fluorescent light by measuring the intensity of the fluorescent light emitted from the material layer S2 of the sample SU in response to the irradiation with the irradiation light while changing the angle φ formed between a line perpendicular to the fluorescent light emitting surface of the material layer S2 and the optical axis L2 of the detection optical system 11. The angle-dependent distribution of the light intensity is normalized with a value at which the formed angle φ is 0°, the light intensity of the maximum area in the normalized angle-dependent distribution of the light intensity is specified, and the orientation parameter S is calculated using the light intensity and the linear relationship determined in advance. Accordingly, it is possible to simply measure the orientation parameter S of the sample through efficient calculation without requiring complicated calculation such as simulation calculation.

In the embodiment, the data indicating the linear relationship corresponding to the film thickness of the material layer S2 and the refractive index of the material layer S2 is selected among data indicating a plurality of linear relationships stored in advance for each combination of a plurality of film thicknesses and a plurality of refractive indexes. In this case, it is possible to calculate the orientation parameter S in a short calculation time through further simple calculation.

Further, the data indicating the linear relationship is determined on the basis of the parameters regarding the refractive index of the material layer S2 and the film thickness of the material layer S2 input by the user. In this case, since the orientation parameter S is calculated using an appropriate linear relationship, it is possible to more accurately measure the orientation parameter S.

Further, light intensity with a maximum value present between the angle at which the light intensity is minimized and 90° in the angle-dependent distribution of the light intensity of the fluorescent light is specified, and the orientation parameter S is determined on the basis of the light intensity. In this case, since the orientation parameter S is calculated using an intensity value of an appropriate angle, it is possible to measure the orientation parameter S more accurately.

Various embodiments have been described, but embodiments are not limited to the above-described embodiments and the embodiments may be changed without departing from the gist described in respective claims or may be applied to other things.

Although in the orientation characteristic measurement system 1 of the embodiment, the irradiation optical system 5 and the detection optical system 11 include the optical fibers, the system is not limited to a system including optical fibers. The system may include other optical elements such as a lens.

Further, although, in the orientation characteristic measurement system 1 of the embodiment, the intensity value of the maximum area is specified for the light intensity distribution data $I_N(\phi)$ generated by the distribution acquisition unit 34, and the orientation parameter S is determined on the basis of this intensity value, the orientation parameter S may be calculated on the basis of the intensity values of other areas such as the minimum area of the light intensity distribution data $I_N(\phi)$.

Further, in the orientation characteristic measurement system 1 of the embodiment, a range of a value of the orientation parameter S may be narrowed down by calculating the value related to the orientation parameter S on the basis of data for specifying the linear relationship stored in advance, and a final orientation parameter S may be acquired by fitting the angle-dependent distribution obtained through simulation calculation in the narrowed range to a measured light intensity distribution.

Further, the parameter calculation unit 36 may calculate the data indicating the linear relationship that is used for calculation of the orientation parameter S, on the basis of the values regarding the film thickness of the material layer S2 that is a measurement target and the refractive index of the material layer S2, which have been input from the user via the input device 19 (a determination process).

In order to solve the problems of the related art, the present inventors have found out the following facts as a result of intensive research.

An intensive examination of the simulation result of angular dependence of intensity of the detection light emitted from the sample with the irradiation of the irradiation light revealed that there is an equality light emitting point which does not depend on the orientation parameter of the sample in the angular dependence. It has been newly found that this equality light emitting point corresponds to a maximum area of characteristics in which the angular dependence is normalized with an intensity value of an angle of 0°, the intensity value in this maximum area is greatly related to the orientation parameter, and the orientation parameter can be derived on the basis of this intensity value.

With the orientation characteristic measurement method, the orientation characteristic measurement program, or the orientation characteristic measurement device according to the above aspect, it is possible to obtain the angle-dependent distribution of the light intensity of the detection light by measuring the intensity of the detection light emitted from the sample in response to the irradiation with the irradiation light while changing the angle formed between a line perpendicular to a detection light emitting surface of the sample and the optical axis of the detection optical system. The angle-dependent distribution of the light intensity is normalized with a value at which the formed angle is 0°, the light intensity of the maximum area in the normalized angle-dependent distribution of the light intensity is specified, and the orientation parameter is calculated using the light intensity and the linear relationship determined in advance. Accordingly, it is possible to simply measure the orientation parameter of the sample through efficient calculation without requiring complicated calculation such as the simulation calculation.

In the embodiment, a selection step of selecting a linear relationship corresponding to a predetermined film thickness and a predetermined refractive index from among a plurality of linear relationships stored for respective combinations of a plurality of film thicknesses and a plurality of refractive indexes in advance may further be included. Further, the computer may be caused to further execute a selection process of selecting a linear relationship corresponding to a predetermined film thickness and a predetermined refractive index from among a plurality of linear relationships stored for respective combinations of a plurality of film thicknesses and a plurality of refractive indexes in advance. Further, the processing device may further include a selection unit configured to select a linear relationship corresponding to a predetermined film thickness and a predetermined refractive index from among a plurality of linear relationships stored for respective combinations of a plurality of film thicknesses and a plurality of refractive indexes in advance. In this case, it is possible to also calculate the orientation parameter in a short calculation time through simple calculation.

Further, a determination step of determining the linear relationship on the basis of parameters regarding the refractive index and the film thickness input by the user may be further included. Further, the computer may be caused to further execute a determination process of determining the linear relationship on the basis of the parameters regarding the refractive index and the film thickness input by the user. Further, a determination unit configured to determine the linear relationship on the basis of the parameters regarding the refractive index and the film thickness input by the user may be further included. In this case, it is possible to measure the orientation parameter more accurately since the orientation parameter is calculated using an appropriate linear relationship.

Further, in the specifying step, the light intensity with the maximum value present between the angle at which the light intensity is minimized and 90° may be specified. Further, in the specifying process, the light intensity with the maximum value present between the angle at which the light intensity is minimized and 90° may be specified. Further, the specifying unit may specify the light intensity with the maximum value present between the angle at which the light intensity is minimized and 90°. In this case, it is possible to more accurately measure the orientation parameter since the orientation parameter is calculated using the intensity value at an appropriate angle.

INDUSTRIAL APPLICABILITY

In the embodiment, the orientation characteristic measurement method, the orientation characteristic measurement program, and the orientation characteristic measurement device are used as applications, and the molecular orientation characteristics of the sample can be simply measured through efficient calculation.

REFERENCE SIGNS LIST

1 Orientation characteristic measurement system
3 Light source
5 Irradiation optical system
9 Rotation mechanism (drive mechanism)
11 Detection optical system
13 Light detector
15 Computer (processing device)
31 Light source control unit
32 Rotation mechanism control unit (control unit)
33 Detection signal acquisition unit
34 Distribution acquisition unit (acquisition unit)
35 Area specifying unit (specifying unit)

36 Parameter calculation unit (calculation unit, selection unit, determination unit)
S1 Transparent substrate
S2 Material layer (sample)

The invention claimed is:

1. An orientation characteristic measurement method of calculating an orientation parameter of a sample having a predetermined refractive index and disposed to a predetermined film thickness on a light transmitting substrate using an irradiation optical system configured to irradiate the sample with irradiation light, a detection optical system configured to guide detection light emitted from the sample with the irradiation of the irradiation light, and a light detector configured to detect the detection light, the orientation characteristic measurement method comprising:
    detecting the detection light using the light detector while changing a formed angle between a line perpendicular to a surface of the sample on the emitting side of the detection light and an optical axis of the detection optical system, and outputting a detection signal;
    normalizing light intensity in which the formed angle is in a predetermined range with light intensity in which the formed angle is 0°, on the basis of an angle-dependent distribution of the light intensity obtained from the detection signal, and acquiring the normalized angle-dependent distribution of the light intensity;
    specifying light intensity in a predetermined local maximum area present between an angle at which the light intensity is minimized and 90° on the basis of the normalized angle-dependent distribution of the light intensity; and
    calculating the orientation parameter on the basis of a predetermined linear relationship between light intensity and a value related to the orientation parameter, and the light intensity in the predetermined local maximum area, the predetermined linear relationship being determined using the predetermined film thickness and the predetermined refractive index.

2. The orientation characteristic measurement method according to claim 1, further comprising:
    selecting a predetermined linear relationship corresponding to the predetermined film thickness and the predetermined refractive index from among a plurality of predetermined linear relationships stored for respective combinations of a plurality of film thicknesses and a plurality of refractive indexes in advance.

3. The orientation characteristic measurement method according to claim 1, further comprising:
    determining the predetermined linear relationship on the basis of parameters regarding a refractive index and a film thickness input by a user.

4. The orientation characteristic measurement method according to claim 1, wherein the specifying includes specifying light intensity with a maximum value present between an angle at which the light intensity is minimized and 90°.

5. A non-transitory computer-readable medium comprising a program for calculating an orientation parameter of a sample having a predetermined refractive index and disposed to a predetermined film thickness on a light transmitting substrate, on the basis of a detection signal obtained by detecting detection light using a detection device including an irradiation optical system configured to irradiate the sample with irradiation light, a detection optical system configured to guide the detection light emitted from the sample with the irradiation of the irradiation light, and a light detector configured to detect the detection light while changing a formed angle between a line perpendicular to a surface of the sample on the emitting side of the detection light and an optical axis of the detection optical system, the program causing a computer to execute processes comprising:
    normalizing light intensity in which the formed angle is in a predetermined range with light intensity in which the formed angle is 0°, on the basis of an angle-dependent distribution of the light intensity obtained from the detection signal, and acquiring the normalized angle-dependent distribution of the light intensity;
    specifying light intensity in a predetermined local maximum area present between an angle at which the light intensity is minimized and 90° on the basis of the normalized angle-dependent distribution of the light intensity; and
    calculating the orientation parameter on the basis of a predetermined linear relationship between light intensity and a value related to the orientation parameter, and the light intensity in the predetermined local maximum area, the predetermined linear relationship being determined using the predetermined film thickness and the predetermined refractive index.

6. The non-transitory computer-readable medium according to claim 5, wherein the processes further comprise:
    selecting a predetermined linear relationship corresponding to the predetermined film thickness and the predetermined refractive index from among a plurality of predetermined linear relationships stored for respective combinations of a plurality of film thicknesses and a plurality of refractive indexes in advance.

7. The non-transitory computer-readable medium according to claim 5, wherein the processes further comprise:
    determining the predetermined linear relationship on the basis of parameters regarding a refractive index and a film thickness input by a user.

8. The non-transitory computer-readable medium according to claim 5, wherein the specifying includes specifying light intensity with a maximum value present between an angle at which the light intensity is minimized and 90°.

9. An orientation characteristic measurement device comprising:
    an irradiation optical system configured to irradiate a sample having a predetermined refractive index and disposed to a predetermined film thickness on a light transmitting substrate with irradiation light,
    a detection optical system configured to guide detection light emitted from the sample with the irradiation of the irradiation light,
    a light detector configured to detect the detection light and output a detection signal,
    a drive mechanism configured to change an angle between a line perpendicular to a surface of the sample on the light emitting side of the detection light and an optical axis of the detection optical system,
    a circuitry configured to control the drive mechanism so that the formed angle is changed, and
    calculate an orientation parameter of the sample on the basis of the detection signal obtained while changing the formed angle,
    wherein the circuitry is configured to:
        normalize light intensity in which the formed angle is in a predetermined range with light intensity in which the formed angle is 0°, on the basis of an angle-dependent distribution of the light intensity obtained from the detection signal, and acquire the normalized angle-dependent distribution of the light intensity;

specify light intensity in a predetermined local maximum area present between an angle at which the light intensity is minimized and 90° on the basis of the normalized angle-dependent distribution of the light intensity; and calculate the orientation parameter on the basis of a predetermined linear relationship between light intensity and a value related to the orientation parameter, and the light intensity in the predetermined local maximum area, the predetermined linear relationship determined using the predetermined film thickness and the predetermined refractive index.

10. The orientation characteristic measurement device according to claim 9, wherein the circuitry is further configured to:

select a predetermined linear relationship corresponding to the predetermined film thickness and the predetermined refractive index from among a plurality of predetermined linear relationships stored for respective combinations of a plurality of film thicknesses and a plurality of refractive indexes in advance.

11. The orientation characteristic measurement device according to claim 9, wherein the circuitry is further configured to:

determine the predetermined linear relationship on the basis of parameters regarding a refractive index and a film thickness input by a user.

12. The orientation characteristic measurement device according to claim 9, wherein the circuitry specifies light intensity with a maximum value present between an angle at which the light intensity is minimized and 90°.

* * * * *